United States Patent
Zhao et al.

(10) Patent No.: US 10,845,494 B2
(45) Date of Patent: Nov. 24, 2020

(54) VIRTUAL SOURCE REDATUMING USING RADIATION PATTERN CORRECTION

(71) Applicant: Saudi Arabian Oil Company, Dhahran (SA)

(72) Inventors: Yang Zhao, Katy, TX (US); Roy Matthew Burnstad, Burnet, TX (US); Weichang Li, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 448 days.

(21) Appl. No.: 15/879,661

(22) Filed: Jan. 25, 2018

(65) Prior Publication Data

US 2018/0217284 A1    Aug. 2, 2018

Related U.S. Application Data

(60) Provisional application No. 62/451,297, filed on Jan. 27, 2017.

(51) Int. Cl.
| | |
|---|---|
| *G06F 17/15* | (2006.01) |
| *G01V 1/37* | (2006.01) |
| *G06F 17/14* | (2006.01) |
| *G01V 1/36* | (2006.01) |

(52) U.S. Cl.
CPC .............. *G01V 1/375* (2013.01); *G01V 1/364* (2013.01); *G01V 1/366* (2013.01); *G06F 17/14* (2013.01); *G06F 17/15* (2013.01)

(58) Field of Classification Search
CPC ........ G01V 1/375; G01V 1/364; G01V 1/366; G06F 17/15; G06F 17/14
See application file for complete search history.

(56) References Cited

U.S. PATENT DOCUMENTS

| | | |
|---|---|---|
| 5,287,328 A | 2/1994 | Anderson et al. |
| 2007/0064531 A1 | 3/2007 | DuBose |
| 2013/0194893 A1 | 8/2013 | Nagarajappa |
| | (Continued) | |

OTHER PUBLICATIONS

Zhao Y, Liu T, Tang G, Zhang H, Sengupta M. Virtual-source imaging and repeatability for complex near surface. Sci Rep. 2019;9(1):16656. Published Nov. 13, 2019. doi:10.1038/s41598-019-53146-w (Year: 2019).*

(Continued)

*Primary Examiner* — Ian J Lobo
(74) *Attorney, Agent, or Firm* — Fish & Richardson P.C.

(57) ABSTRACT

Received shot gathers are sorted to a common receiver gather. A target three-dimensional (3D) amplitude spectrum of seismic wavefield direct arrivals is computed from synthetic data. A 3D amplitude spectrum of seismic wavefield direct arrivals in field data is computed for each receiver. A matched filter is calculated from the 3D amplitude spectrum of field data to target response and applied to downgoing seismic wavefields separated from the common receiver gather to generate filtered downgoing seismic wavefields. Time-dependent smoothing of the filtered downgoing seismic wavefields is performed to generate smoothed downgoing seismic wavefields. A cross-correlation is calculated between upgoing seismic wavefields separated from the common receiver gather and the smoothed downgoing seismic wavefields.

20 Claims, 21 Drawing Sheets

(56) References Cited

U.S. PATENT DOCUMENTS

2015/0316674 A1 11/2015 Deschizeaux et al.

OTHER PUBLICATIONS

Alexandrov et al., "Improving imaging and repeatability on land using virtual source redatuming with shallow buried receivers," XPo55463335, Geophysics vol. 8, No. 2, Mar. 1, 2015, 12 pages.

Askari and Siahkoohi, "Ground roll attenuation using the S and x-f-k transforms," Geophysical Prospecting vol. 56, Jan. 2008, 10 pages.

Cadzou, "Signal enhancement—A Composite Property Mapping Algorithm," IEEE Transactions on Acoustics, Speech and Signal Processing, vol. 36, No. 1, Jan. 1988, 14 pages.

Chen, "Robust matrix rank reduction methods for seismic data processing," Thesis for the degree of Master of Science in Geophysics, University of Alberta, Fall of 2013, 136 pages.

Diallo et al., "Characterization of polarization attributes of seismic waves using continuous wavelet transforms," Geophysics vol. 71, No. 3, May-Jun. 2006, 12 pages.

Halliday et al., "Interferometric ground-roll removal: Attenuation of scattered surface waves in single-sensor data," XP001553286, Geophysics, Society of Exploration Geophysicists vol. 75, No. 2, Mar. 1, 2010, 11 pages.

Li and Nozaki, "Application of Wavelet Cross-Correlation Analysis to a Plane Turbulent Jet," JSME International Journal Series B, vol. 40, No. 1, Feb. 15, 1997, 9 pages.

Liu and Fomel, "Seismic data analysis using local time-frequency decomposition," Geophysical Prospecting vol. 61, Issue 3, May 2013, 21 pages.

Mallat and Zhang, "Matching Pursuits With Time-Frequency Dictionaries," IEEE Transactions on Signal Processing vol. 41, No. 12, Dec. 1993, 19 pages.

Trickett et al., "Robust rank-reduction filtering for erratic noise," SEG, SEG Las Vergas 2012 Annual Meeting, Nov. 4-9, 2012, 5 pages.

Ulrych et al., "Tutorial: Signal and noise separation: Art and science," Geophysics vol. 64, No. 5, Sep.-Oct. 1999, 9 pages.

Van der Neut et al., "Controlled-source interferometric redatuming by crosscorrelation and multidimensional deconvolution in elastic media," Geophysics vol. 76, No. 4, Jul.-Aug. 2011, 14 pages.

Van der Neut, "Interferometric redatuming by multidimensional deconvulution," Thesis for the degree of Master of Applied Geophysics, Technische Universiteit Delft, Dec. 17, 2012, 295 pages.

Yu et al., "Wavelet-Radon domain dealiasing and interpolation of seismic data," Geophysics vol. 72, No. 2, Mar.-Apr. 2007, 9 pages.

International Search Report and Written Opinion in International Application No. PCT/US2017/061452 dated Apr. 9, 2018, 16 pages.

International Search Report and Written Opinion issued in International Application No. PCT/US2018/015537 dated May 3, 2018, 16 pages.

Ling et al., "A fast SVD for multilevel block Handkel matrices with minimal memory storage," Numerical Algorithms, Baltzer, Amsterdam, vol. 69, No. 4, Oct. 28, 2014, 17 pages.

International Search Report and Written Opinion issued in International Application No. PCT/US2018/021081 dated Jun. 8, 2018, 15 pages.

Gulf Cooperation Council Examination Report issued in GCC Application No. GC 2018-34663 dated Dec. 2, 2019, 4 pages.

Gulf Cooperation Council Examination Report issued in GCC Application No. GC 2018-34906 dated Sep. 27, 2019, 5 pages.

GCC Examination Report in GCC Appln. No. Gc 2018-34906, dated Jan. 25, 2020, 4 pages.

Gulf Cooperation Council Examination Report issued in GCC Application No. GC 2017-34273 dated Oct. 13, 2019, 4 pages.

Alexandrov et al., "Improving land seismic repeatability with virtual source redatuming: synthesis case study," SEG Technical Program Expanded Abstracts 2012, Sep. 2012, pp. 1-5.

Gulf Cooperation Council Examination Report issued in GCC Application No. GC2018-34663 dated Jul. 28, 2019, 4 pages.

Gulf Cooperation Council Examination Report issued in GCC Application No. GC2017-34273 dated Jun. 7, 2019, 4 pages.

* cited by examiner

Ttaper1 (ms) : Starting time for Hamming window taper to direct arrival (default: 0 ms)
Ttaper2 (ms) : Ending time for Hamming window taper to direct arrival (default: 150 ms)
Direct Arrival With and Without Time Taper 700b

VIRTUAL SOURCE REDATUMING USING RADIATION PATTERN CORRECTION

BACKGROUND

Virtual source (VS) redatuming is an interferometry-based acquisition and processing method that can overcome near-surface complexity in time-lapse seismic image applications. The technique cross-correlates downgoing wave energy with upgoing energy to redatum surface source records, to buried receiver locations. By cross-correlating wavefields from these two paths, VS records can help resolve time-lapse changes occurring between surface source, and buried receivers. However, repeatability issues exist, especially in near-field land applications with complex near surface structures.

SUMMARY

The present disclosure describes methods and systems, including computer-implemented methods, computer program products, and computer systems for virtual source (VS) redatuming.

In an implementation, received shot gathers are sorted to a common receiver gather. A target three-dimensional (3D) amplitude spectrum of seismic wavefield direct arrivals is computed from synthetic data. A 3D amplitude spectrum of seismic wavefield direct arrivals in field data is computed for each receiver. A matched filter is calculated from the 3D amplitude spectrum of field data to target response, and applied to downgoing seismic wavefields separated from the common receiver gather to generate filtered downgoing seismic wavefields. Time-dependent smoothing of the filtered downgoing seismic wavefields is performed to generate smoothed downgoing seismic wavefields. A cross-correlation is calculated between upgoing seismic wavefields separated from the common receiver gather and the smoothed downgoing seismic wavefields.

The previously-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations so as to realize one or more of the following advantages. First, a downgoing approximation procedure is described, that combines techniques of time gating and surface source array tapering with techniques of time-dependent smoothing and finding/application of a matched filter to amplitude spectrum, so as to approximate an ideal P-wave downgoing wavefield, as well as its multi-dimensional radiation pattern. Iterative steps are described for finding and applying a matched filter for an ideal amplitude spectrum of downgoing direct arrivals in 3D space, and time-dependent smoothing. By targeting an optimal approximation of a downgoing direct P-wave before correlation with upgoing reflections, significant enhancement of the correct image associated with a cleaner downgoing P-wave field is obtained, while suppressing the artifacts associated with crosstalk. Second, the described methodology solves conflicting repeatability issues such as wave interference within downgoing direct arrivals, mismatched frequency content with upgoing reflected arrivals, and varied surface source spectra within and between time-lapse surveys existing in the field data. Third, compared to time gating and array tapering alone, the described methodology resolves non-repeatability issues across land monitor surveys. Fourth, the described methodology improves repeatability by reducing effects of near-surface variations. Fifth, the described methodology improves the quality of two-dimensional (2D)/3D seismic images if buried sensors are applicable. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

The patent or application file contains at least one color drawing executed in color. Copies of this patent application publication with color drawing(s) will be provided by the Patent and Trademark Office upon request and payment of the necessary fee.

DETAILED DESCRIPTION

Figure 1A:
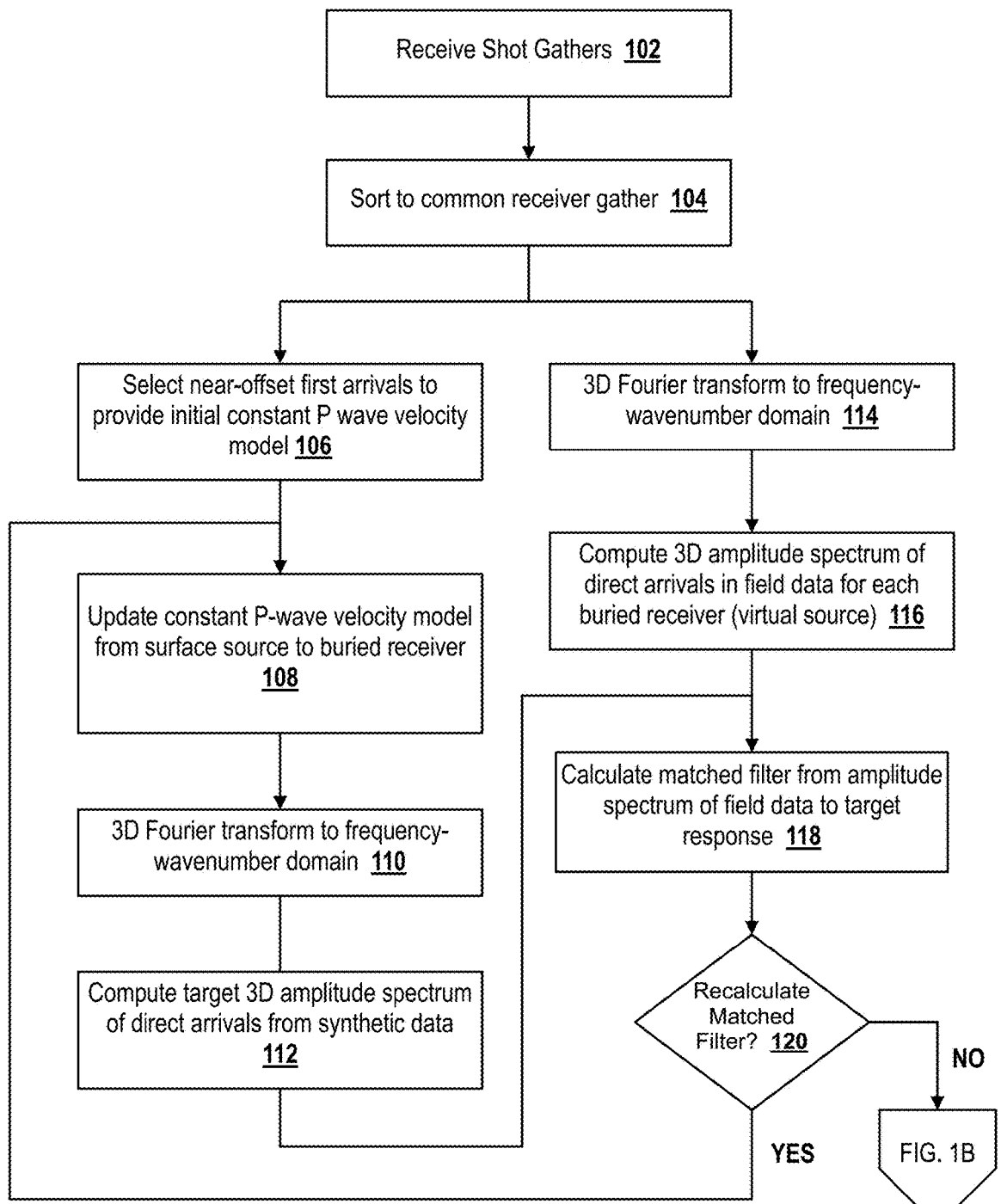
FIGS. 1A and 1B are block diagrams illustrating a method for virtual source (VS) redatuming for four-dimensional seismic reservoir monitoring that improves both image quality and repeatability, according to an implementation of the present disclosure.

The following detailed description describes virtual source (VS) redatuming and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications, without departing from scope of the disclosure. Thus, the present disclosure is not intended to be limited to the described or illustrated implementations, but is to be accorded the widest scope consistent with the principles and features disclosed.

VS is an interferometry-based acquisition and processing method that can overcome near-surface structure complexity in time-lapse seismic image applications. VS methods cross-correlate downgoing seismic wave energy with upgoing (reflected) seismic wave energy to redatum surface source records to buried receiver locations. By cross-correlating wavefields from these two paths, VS records can help resolve time-lapse changes occurring between surface seismic sources and buried seismic receivers. In other words, VS redatuming is used to simplify a recorded seismic wavefield and eliminate distortions associated with heterogeneities located between a seismic source and a seismic receiver. However, repeatability issues exist, especially in near-field land applications with complex near-surface structures.

An additional goal of VS redatuming is to improve time-lapse survey repeatability by correcting for time-lapse noise such as near-surface diurnal and seasonal cycles as well as small changes in acquisition geometry and shot coupling. Using total early arrival seismic wavefields in small time windows to estimate downgoing direct P-waves has been demonstrated to be an imperative part of VS development. As an alternative to time windowing, VS data may also be improved by deconvolving the VS record with an estimated amplitude radiation pattern of downgoing early arrival seismic wavefields or by replacing the pattern with a desired one, while honoring the recorded phase.

To date, most field applications focus on VS data acquired with seismic receivers in deep marine environments or in horizontal wells. Little has been published about VS field data onshore where buried seismic receivers are near active (near-field) seismic sources. With VS redatuming, the near-field seismic sources may lead to a bandwidth mismatch between downgoing early arrival seismic wavefields and upgoing seismic reflections resulting in a high-frequency bias on output VS records. The over-interference between multiple wave types occurring in downgoing/upgoing wave windows also deteriorate VS quality.

Described is a VS redatuming method which includes iterative estimation and application of a matched filter for an ideal amplitude spectrum of downgoing direct seismic wave energy arrivals in three dimensional (3D) space and application of time-dependent smoothing before cross-correlation. Time-frequency-wavenumber filtering is performed based on down-going, direct, P-wave estimation and near field approximation and including source array spatial tapering and phase invariant approximation. Amplitude spectrum replacement improves image quality and repeatability of VS redatuming. The described methodology uses the concept of interferometry to transform a 3D seismic data set acquired with seismic sources on the surface and seismic receivers below the surface into a data set which appears as though both the sources and receivers are located below complex near surface structures.

The described technique obtains significantly improved VS response, and can overcome the previously-mentioned repeatability issues that arise; especially in near-field land applications with complex near surface structures. The described methodology also retains the original phase of recorded downgoing early arrival seismic wavefields but steers the radiation pattern of the VS, such that it closely represents that of an ideal downgoing direct P-wave.

Performance improvements are quantifiable using repeatability metrics extracted from field data. Comparison with previous methods, such as a VS time-gating technique, indicates that the newly-described matching filter can significantly improve both repeatability and image quality produced from resulting time-lapse VS seismic data.

At a high-level, the VS method, redatums surface seismic sources to buried seismic sensor locations, and is designed to cancel or mitigate effects of near surface complexities. The elastic VS cross-correlates two-way wave fields as contributed by all participating seismic sources described as follows in Equation (1):

$$V(r_B | r_A) \approx \sum_{r_S} \begin{bmatrix} D_P(r_A | r_S; t) \\ + \\ D_M(r_A | r_S; t) \\ \dots \end{bmatrix} \times \begin{bmatrix} U_P(r_B | r_S; t) \\ + \\ U_M(r_B | r_S; t) \\ + \\ U_S(r_B | r_S; t) \end{bmatrix}, \quad (1)$$

where × denotes temporal cross-correlation, $r_A$, $r_B$, and $r_S$ denote the spatial coordinates of two seismic receivers at spatial locations A and B, and the seismic source location, respectively. The resulting V ($r_B|r_A$) is the interferometric data that would be recorded in receiver $r_B$ when $r_A$ is treated as a VS. The left column in the summation on the right hand side of Equation (1) represents a downgoing direct wavefield received by shallow buried seismic sensors at a near-offset, while the right column represents upgoing reflected seismic wavefields. $D_P$, $U_P$, $D_M$, $U_M$, and $U_S$ are received seismic wavefields associated with the direct P arrival, the multiples and other shear waves, respectively.

In Equation (1), only the first correlation of the downgoing direct P-wave $D_P(r_A|r_S;\ t)$ with upgoing $U_P(r_B|r_S;\ t)$ forms a correct seismic image. The remaining correlation generates artifacts known as "crosstalk." More generally, correlation of the seismic wavefields at $r_A$ and $r_B$ belonging to the same wave mode will produce correct events while other groupings may not due to incorrect phases.

The described methodology introduces two overlapping methods capable of mitigating seismic image artifacts associated with crosstalk while enhancing a P-wave inside downgoing seismic wavefield windows, and consequently improving VS redatuming repeatability and image quality. The described methods include iterative steps for finding and applying a matched filter for an ideal amplitude spectrum of downgoing direct arrivals in 3D, and time-dependent smoothing. Seeking to recover an ideal radiation pattern for VS, the described methodology implements a matched filter with time-dependent smoothing. By targeting an optimal approximation of downgoing direct P-waves before correlation with upgoing seismic reflections, a correct image associated with a cleaner downgoing P-wave field is enhanced, while artifacts associated with crosstalk are suppressed. The described methodology of cross-correlation with radiation pattern correction and related amplitude steering can be potentially used in signal processing, for example electrical engineering, medical imaging, and well log denoising.

Figure 1B:
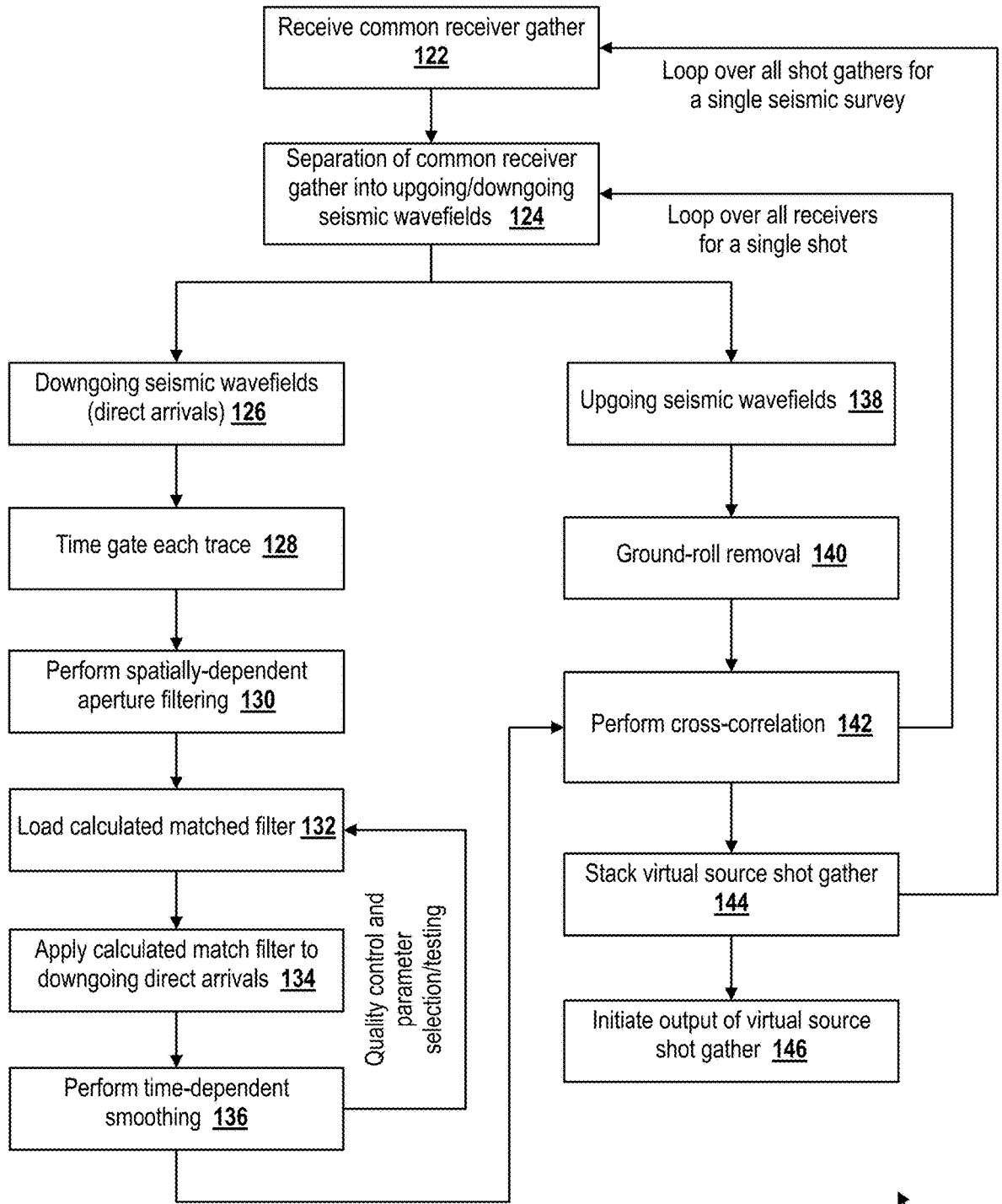

At a high-level, the two overlapping methods are used to:
a) As illustrated in FIG. 1A, compute a 3D frequency-wavenumber spectrum of downgoing seismic wavefield direct arrivals from a common receiver gather. Estimate the ideal 3D frequency-wavenumber spectrum of a direct P-wave by replacing a near surface layer. Iteratively solve for a matched filter to minimize the misfit function of 3D amplitude spectrum (only) between the computed and the ideal direct arrivals (as illustrated in FIG. 1B). The velocity is used in computing an ideal direct P-wave spectrum that is updated with a residual in each iteration.
b) As illustrated in FIG. 1B, a 3D matched filter obtained within a downgoing seismic wavefield window is applied. Time gating of the raw seismic traces captures seismic signals associated with the direct seismic wavefield arrival. Spatially-dependent filtering on an input source array of seismic shot gathers aims to favorably weigh the contribution of input source traces that are within the offset range so that both the far field approximation is valid and that the interferometry assumption for a stationary phase approximately holds. Time-dependent smoothing is performed inside a window gate. Quality control can be performed after each iteration.

The filter of method b) is constructed by defining the following two-dimensional (2D) Gaussian weighting function center at a VS location per Equation (2):

$$g(r) = \frac{1}{R\sqrt{2\pi}} e^{-\frac{r^2}{2R^2}}, \quad (2)$$

where R is source array aperture, r is the offset between source-buried receiver pair, and g(r) is the output Gaussian weight.

Figure 2A:
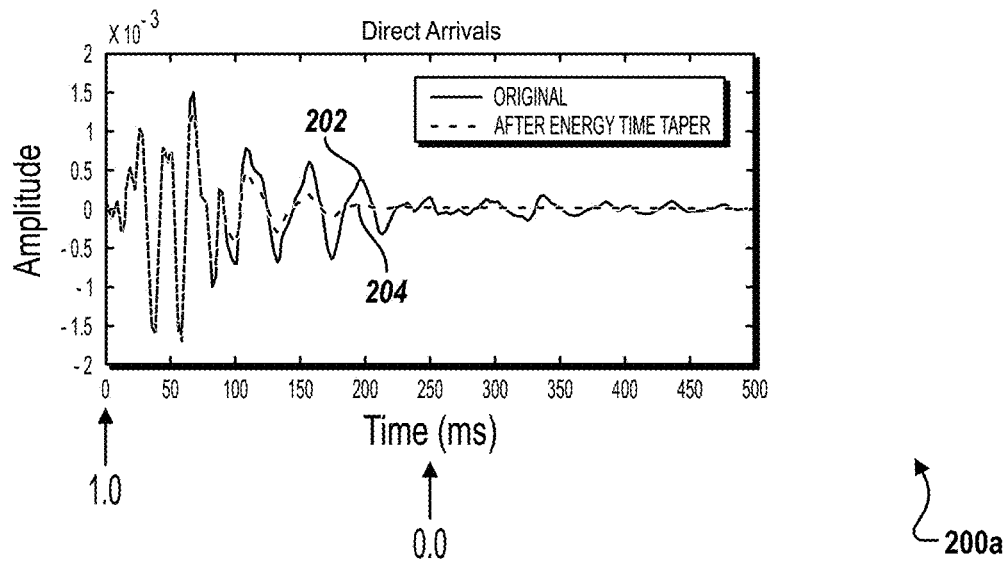
FIG. 2A is a data plot illustrating the use of a Hamming window, according to an implementation of the present disclosure.

Similarly, the time-dependent filter can be expressed as a Hamming window starting at the peak of direct arrival wavelet. Referring to FIG. 2A, FIG. 2A is a data plot 200a illustrating the use of a Hamming window, according to an implementation of the present disclosure. In FIG. 2A, a direct seismic arrival is shown without time taper (TTaper)) 202 and with time taper 204.

Figure 2B:
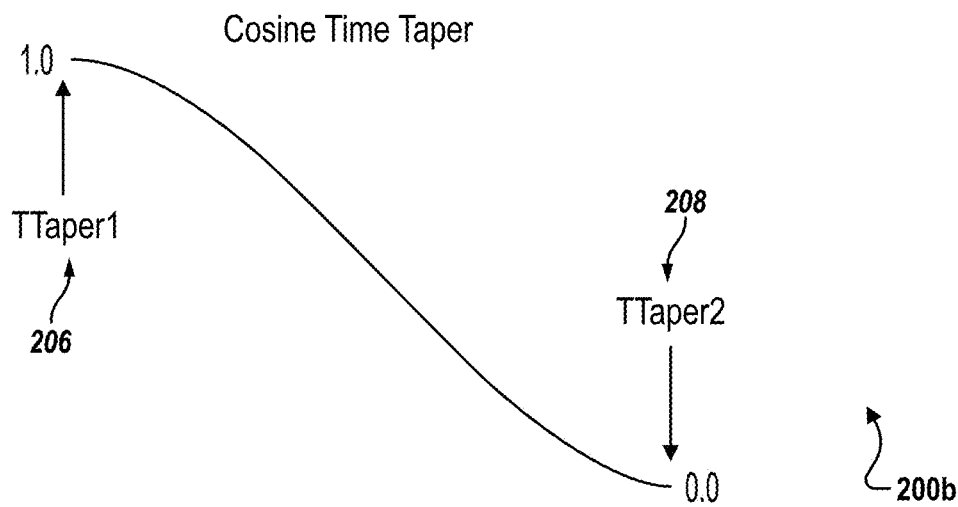
FIG. 2B is a data plot representing a cosine time taper, according to an implementation of the present disclosure.

Referring to FIG. 2B, FIG. 2B is a data plot representing a cosine time taper 200b, according to an implementation of the present disclosure. TTaper1 (milliseconds (ms)) 206 is the starting time for the Hamming window taper to direct arrival (default 0 ms). TTaper2 (ms) 208 is the ending time for the Hamming window taper to direct arrival (default 150 ms).

Per Equation (3):

$$w(t) = 0.5\left(1 - \cos\left(\frac{2\pi t}{T-1}\right)\right), \quad (3)$$

T is the time gate length and t stands for time samples counted from the wavelet peak.

In method a), iteratively finding and applying an ideal matched filter for a 3D amplitude spectrum of downgoing direct seismic wavefield arrivals may be considered as a frequency-wavenumber (f-k) filtering, enforcing an ideal radiation pattern associated with the desired down-going P-wave-field, while leaving the phase intact. Specifically, this ideal matched filter can be achieved as a minimization problem, as expressed in Equation (4):

$$\min_{f} \|D(k_x, k_y, \omega)f(k_x, k_y, \omega) - D_P(k_x, k_y, \omega|f)\|_2^2, \quad (4)$$

where $D(k_x, k_y, \omega)$ and $D_P(k_x, k_y, \omega|f)$ are the 3D amplitude spectra (wavenumber $k_x$, wavenumber $k_y$ and frequency $\omega$) of the input traces and the desired P-wavefield, respectively, $f(k_x, k_y, \omega)$ is the corresponding matched filter intended to be solved using a minimum energy criterion in a least-square inversion process. The desired P-wave amplitude spectrum $D_P(k_x, k_y, \omega|f)$ is based on an initial homogeneous velocity model which is updated with the residual error associated with the matched filter obtained at each iteration. N and i are a total iteration number and an iteration index.

After a first iteration, the filter can be updated iteratively, using a regularized inversion form, as expressed in Equation (5):

$$f_{i+1} = f_i + (D^T D + \varepsilon I)^{-1} D^T (D_p - D f_i) \quad (5),$$

where $\varepsilon$ is the regularization factor. The iterations are needed as $D_p$ is also updated as a function of f.

The initial homogeneous velocity model for P-wave is built by picking near-offset first arrivals, thus the amplitude spectrum $D_P(k_x, k_y, \omega|f)$ is computed accordingly. The constant homogeneous P velocity model is iteratively updated, which is coupled with the matched filter update. The velocity is achieved using the same minimization cost function (that is, Equation (4)), but is subjected to velocity.

After an initial model is built, the velocity can be updated iteratively using Ricker wavelet's 3D analytic Green's function, as expressed in Equation (6):

$$P_{i+1} = P_i + r\left[t - \frac{1}{\pi\omega}\sqrt{\frac{3}{2}(D^T \Delta D + \varepsilon I)^{-1} D^T \Delta D}\right]^{-1}, \quad (6)$$

where P is the constant velocity model, ΔD is the data residual, r is the offset, and t is the arrival time. ω represents the central frequency of the Ricker wavelet.

To apply the matched filter obtained from method a), the data is reorganized back into the common shot domain—written in terms of each source-receiver pair, as expressed in Equation (7):

$$V(r_B | r_A; \omega) = \sum_{i=1}^{N} Sm\{f_i(r_A | r_S; \omega) D(r_A | r_S; \omega)\} U(r_B | r_S; \omega), \quad (7)$$

where $V(r_A | r_B)$ is an output trace after application of the matched filter, recorded in receiver $r_B$ when $r_A$ is treated as a virtual source, Sm is a time-dependent smoothing operator, and $U(r_B | r_S; \omega)$ represents the upgoing wavefield traces in frequency domain.

The adaptively updated matched filter is only applied to the downgoing (direct P) wavefield prior to cross-correlation with the upgoing (reflected) wavefields. The matched filter is then immune to negatively influencing a four-dimensional (4D) signal carried by the reflected wavefield after cross-correlation.

Where seismic receivers are buried in shallow land (for example, 30 meters (m)-150 m, which is shorter than one receiver wavefield), typical wave-equation-based or ray-based velocity updating methods are inappropriate for such a small scale. Instead, a homogenous velocity model is useful for amplitude spectrum corrections rather than using phase. In addition, solving a 3D Green's function using an analytic form is more computationally efficient than using a numerical solver.

FIGS. 1A and 1B are block diagrams illustrating a method 100 for virtual source (VS) redatuming for 4D seismic reservoir monitoring that improves both image quality and repeatability, according to an implementation of the present disclosure. For clarity of presentation, the description that follows generally describes the method in the context of the other figures in this description. However, it will be understood that the method may be performed, for example, by any suitable system, environment, software, and hardware, or a combination of systems, environments, software, and hardware, as appropriate. In some implementations, various steps of the method can be run in parallel, in combination, in loops, or in any order.

At a high-level, FIG. 1A computes a 3D frequency-wavenumber spectrum of downgoing direct arrivals from an actual common receiver gather. An ideal 3D frequency-wavenumber spectrum of a direct P-wave is estimated by replacing a near surface layer. A matched filter is iteratively solved for to minimize a misfit function of 3D amplitude spectrum (only) between computed and ideal direct seismic wavefield arrivals. The velocity used in computing the ideal direct P-wave spectrum is updated with the residual error in each iteration. Note that Equation (4) represents the overall method.

At 102, available shot gathers are received. In typical implementations, the available shot gather data is received in a data structure (for example, an array of data in a seismic bin grid data exchange format or other format) reflecting a standard seismic bin grid. From 102, method 100 proceeds to 104.

At 104, the received shot gathers are sorted into a common receiver gather. In typical implementations, any common sorting algorithm can be used to sort on various data criteria (for example, by time, geographic location, or other data). From 104, method 100 proceeds to 106 and 116.

In some implementations, parallel-type processing functionality (for example, multi-threading) can be leveraged. For example, each processing branch (that is, starting with 106 and 116) can be managed by appropriate functionality to ensure completions of each branch prior to particular processing, operations, or functions (for example, at 118 of method 100).

At 106, near-offset first arrivals are selected to provide an initial constant P-wave velocity model. In typical implementations: 1) direct first arrivals are selected within a very small offset (for example, <20 m); 2) onset arrivals are automatically selected; 3) distances between each seismic shot to a buried receiver are divided by selected arrivals times to generate constant velocity values along each shot-receiver wavepath; and 4) average velocity values from 3) are used to output a uniform homogenous velocity treated as an initial constant P-wave velocity model. From 106, method 100 proceeds to 108.

At 108, the constant P-wave velocity model is iteratively updated using Equation (6) from a surface seismic source to a buried seismic receiver. Note that on the first pass through the described methodology, no update is performed to the constant P-wave velocity model. From 108, method 100 proceeds to 110.

At 110, the constant P-wave velocity model is transformed using a 3D Fourier transform into a frequency-wavenumber domain. From 110, method 100 proceeds to 112.

At 112, a target 3D amplitude spectrum of direct arrivals is computed from synthetic data. In typical implementations, the synthetic data is generated by numerically solving an acoustic wave equation using a standard finite difference solver with the constant P-wave velocity model from 106.

To generate synthetic datasets in an implementation, an example acoustic wave equation providing a vector field particle velocity can be given by:

$$\nabla^2 u - \frac{1}{c^2}\frac{\partial^2 u}{\partial t^2} = 0, \qquad (8)$$

where $\nabla^2$ is the Laplace operator, u is particle velocity, t is time, and c is the speed of sound. From 112, method 100 proceeds to 118.

At 118, a matched filter is calculated for the 3D amplitude spectrum of field data to target response using Equation (5). In some implementations, the calculated matched filter is stored in a computerized data store. From 118, method 100 proceeds to 120 in FIG. 1B.

At 120, a determination is made as to whether the iterative process for updating the matched filter should be recalculated. Typically, the determination is based on a comparison between a tolerance value and calculated difference (misfit) of the 3D amplitude spectrum of field data (refer to 116) and the target 3D amplitude spectrum of synthetic data (Equation (8) from 112). In typical cases, the tolerance value is set at approximately 1% of the average values of the target amplitude spectrum. If it is determined that the calculated misfit value is less than or equal to the set tolerance value, then method 100 proceeds back to 108 to recalculate the matched filter. The 3D amplitude spectrum of field data (from 116) and the calculated difference (between 116 and 112) is returned to 108. However, if it is determined that the calculated misfit value is greater than the set tolerance value, then method 100 proceeds to 122 in FIG. 1B.

Turning to the other processing branch, at 114, the common receiver gather is transformed into a frequency-wavenumber domain using a 3D Fourier transform. From 114, method 100 proceeds to 116.

At 116, the 3D amplitude spectrum of direct arrivals in field data is computed for each buried receiver (VS) using Equation (5) (for example, a standard Fourier transform). From 116, method 100 proceeds to 118, as previously described.

At a high-level, FIG. 1B applies an obtained 3D matched filter within a downgoing wave window. Time-dependent smoothing is performed inside a window gate. Quality control is performed after each iteration.

At 122, the common receiver gather of FIG. 1A (from 104) is received. From 122, method 100 proceeds to 124.

At 124, a separation of the common receiver gather into upgoing/downgoing seismic wavefields is performed. Note that if the geophone and hydrophone are installed together, the hydrophone records only a scalar pressure response and does not distinguish between up and down wavefields. The geophone records the vector displacement of the buried receiver position that is different for the up and down wavefield. The effective combination (for example, an adaptive summation or subtraction) of these components can output upgoing and downgoing wavefield data. If a geophone and hydrophone installation is available in field, an upgoing/downgoing separation is desired to meet pre-request data requirements of VS. Otherwise, direct early arrivals are treated as downgoing waves, whereas target reflection data is treated as upgoing wavefields. From 124, method 100 proceeds to 126 and 138.

In some implementations, parallel-type processing functionality (for example, multi-threading) can be leveraged. For example, each processing branch (that is, starting with 126 and 138) can be managed by appropriate functionality to ensure completions of each branch prior to particular processing, operations, or functions (for example, at 142).

At 126, in some implementations, the separated downgoing wavefield data is simply passed on for further processing (for example, to 128). In other implementations, the separated downgoing wavefield data can be pre-processed prior to use (for example, normalization) prior to further processing. From 126, method 100 proceeds to 128.

Figure 3:
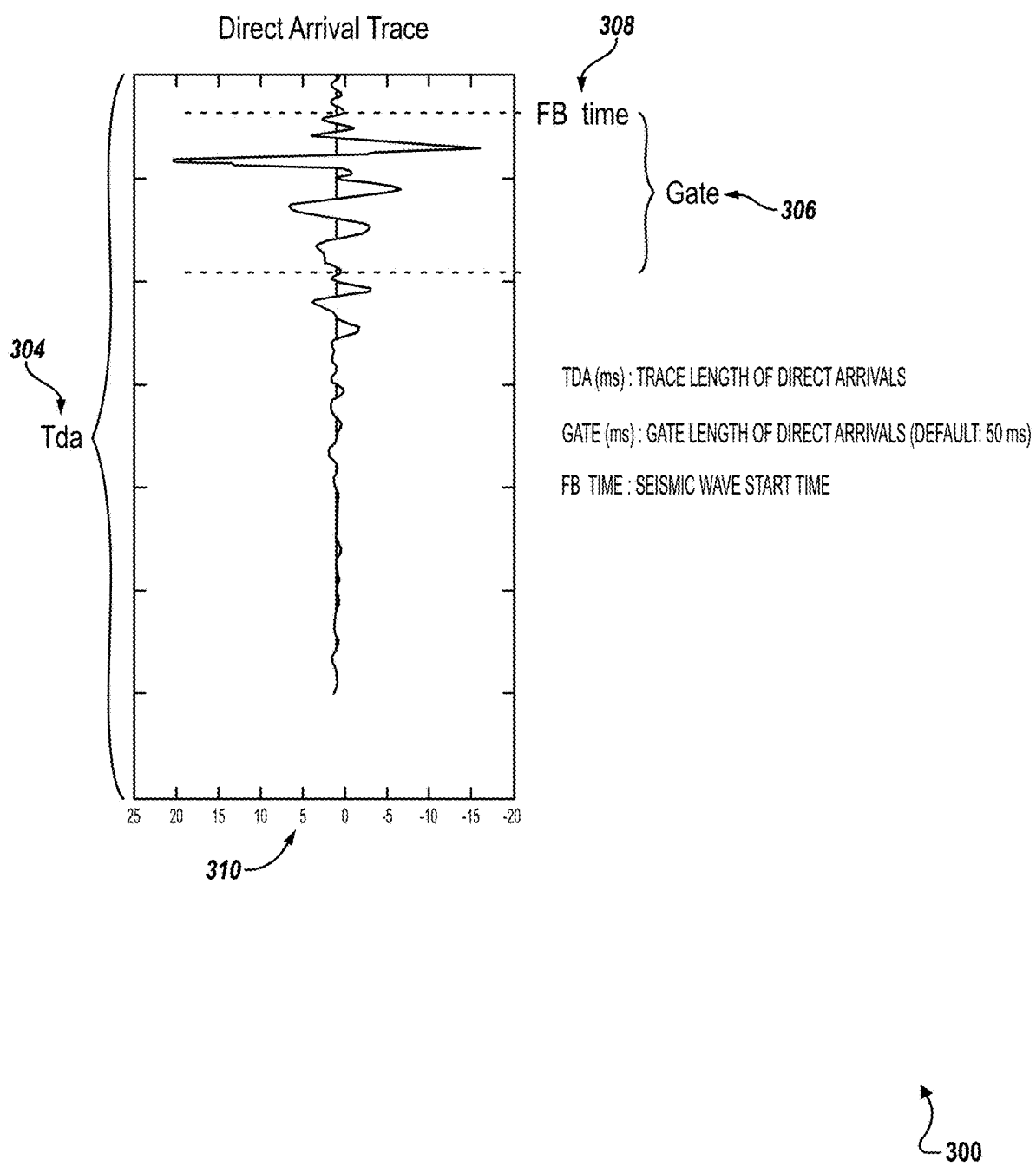
FIG. 3 is a data plot illustrating time gating of a particular direct arrival seismic trace, according to an implementation of the present disclosure.

At 128, each seismic trace is time gated. Referring to FIG. 3, FIG. 3 is a data plot 300 illustrating time gating of a particular direct arrival seismic trace, according to an implementation of the present disclosure. In FIG. 3, with respect to a direct arrival trace 302, Tda (ms) 304 is the trace length of a direct arrival seismic trace 302, the gate 306 is the gate length of direct arrivals (default 50 ms), and the FB time 308 is the seismic wave start time. The amplitude 310 (illustrated unit is 0.001 m) of the direct arrival trace 302 is indicated on the bottom axis of data plot 300. From 128, method 100 proceeds to 130.

At 130, spatial dependent aperture filtering is performed using Equation (2). From 130, method 100 proceeds to 132.

At 132, a calculated matched filter from an iteration of FIG. 1A is loaded from a computerized data store. From 132, method 100 proceeds to 134.

At 134, the loaded matched filter is applied to the downgoing wavefields. From 134, method 100 proceeds to 136.

At 136, time-dependent smoothing is performed on the filtered downgoing wavefields using Equation (3). Note that a quality control (QC) and parameter testing/selection can be performed in a loop back to 132. Typically, QC is a human intervention step used to examine convergence of the previously-described misfit calculation between the amplitude spectrum of field data and synthetic data, after each matched filter iteration. If not convergent, the matched filter needs to be re-computed from FIG. 1A. In case a human operator determines that the matched filter needs to be recalculated, the human operator can direct the processing back to that of FIG. 1A to re-calculate/update the matched filter which can be reloaded at 132 to use with method 100. In some implementations, the QC function can be performed by an automated process or machine learning/artificial intelligence process. From 136, method 100 proceeds to 142.

At 138, in some implementations, the separated upgoing wavefield data is simply passed on for further processing (for example, to 140). In other implementations, the separated upgoing wavefield data can be pre-processed prior to use (for example, normalization) prior to further processing. From 138, method 100 proceeds to 140.

At 140, ground-roll removal is performed each upgoing seismic wavefield. In shot gathers, ground roll is characterized by late-arriving, high amplitude, and low-frequency events which define a steep triangular-shaped central zone which masks reflected arrivals. Ground roll events have a small apparent velocity (or, equivalently, a large dip) and can be isolated and removed by performing, for example, a 2D Fourier transform. In one example, ground roll can be located in a fan-like region. By zeroing the Fourier transform values in the fan-like region and then inverse Fourier transforming, the ground roll can be removed. From 140, method 100 proceeds to 142 with the smoothed data from 136.

At 142, a cross-correlation is calculated between each time-dependently smoothed upgoing seismic wavefield and time-dependently smoothed downgoing seismic wavefield a cross-correlation is performed between each reflection and direction arrival trace using equation (7). Note that a loop over all receivers from a single shot is performed from 124, 138, 140, and 142. From 142, method 100 proceeds to 144.

At 144, VS shot gather data is stacked. Note that a loop over all shot gathers from a single seismic survey is performed from 122, 124, 138, 140, 142, and 144. From 144, method 100 proceeds to 146.

At 146, output of the stacked VS shot gather is initiated. For example, the stacked VS shot can be output to a visual display device for visualization or to a computerized data store. After 146, method 100 stops.

FIGS. 4A-4E are data plots 400a-400e, respectively, illustrating four stages of processing typical source array generated seismic data (2D—aperture 30 m at 7.5 m sampling) and its f-k power spectrum (radiation pattern of VS) using method 100 described in FIGS. 1A and 1B, according to an implementation of the present disclosure. Referring to FIGS. 5A and 5B, FIGS. 5A and 5B are data plots 500a and 500b, respectively, illustrating example ideal and noisy signals, respectively, according to an implementation of the present disclosure. As can be seen in FIG. 5A, signal trace 502a is represented by a smooth curve. In FIG. 5B, seismic signal 502b contains various noise (for example, noise 504b and 506b).

Figure 4A:
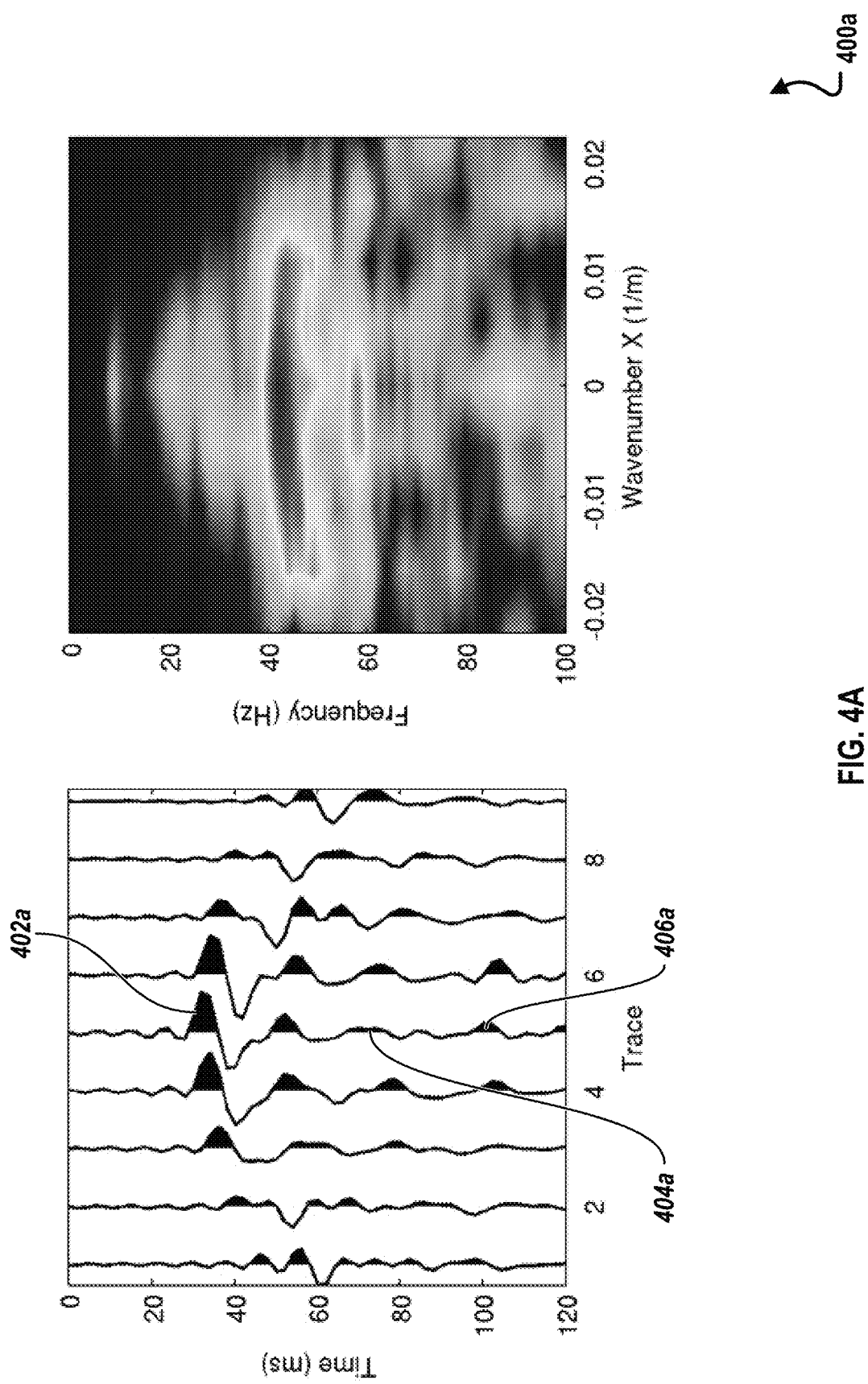
FIGS. 4A-4E are images illustrating four stages of processing typical source array generated seismic data and its frequency-wavenumber power spectrum using the method described in FIGS. 1A and 1B, according to an implementation of the present disclosure.

FIG. 4A illustrates data plots 400a of an input early arrival total seismic wavefield in corresponding Time (ms)/Trace and Frequency (Hz)/Wavenumber X (1/m), according to an implementation of the present disclosure. For example, and with respect to FIG. 5B, signal trace 502b contains various noise (for example, noise 504a and 506a). For reference, ideal signal traces in the Time/Trace data plot should resemble the signal trace 502a of FIG. 5A and the Frequency/Wavenumber data plot should resemble a symmetrical, diamond-like shape (as in FIG. 4E).

Figure 4B:
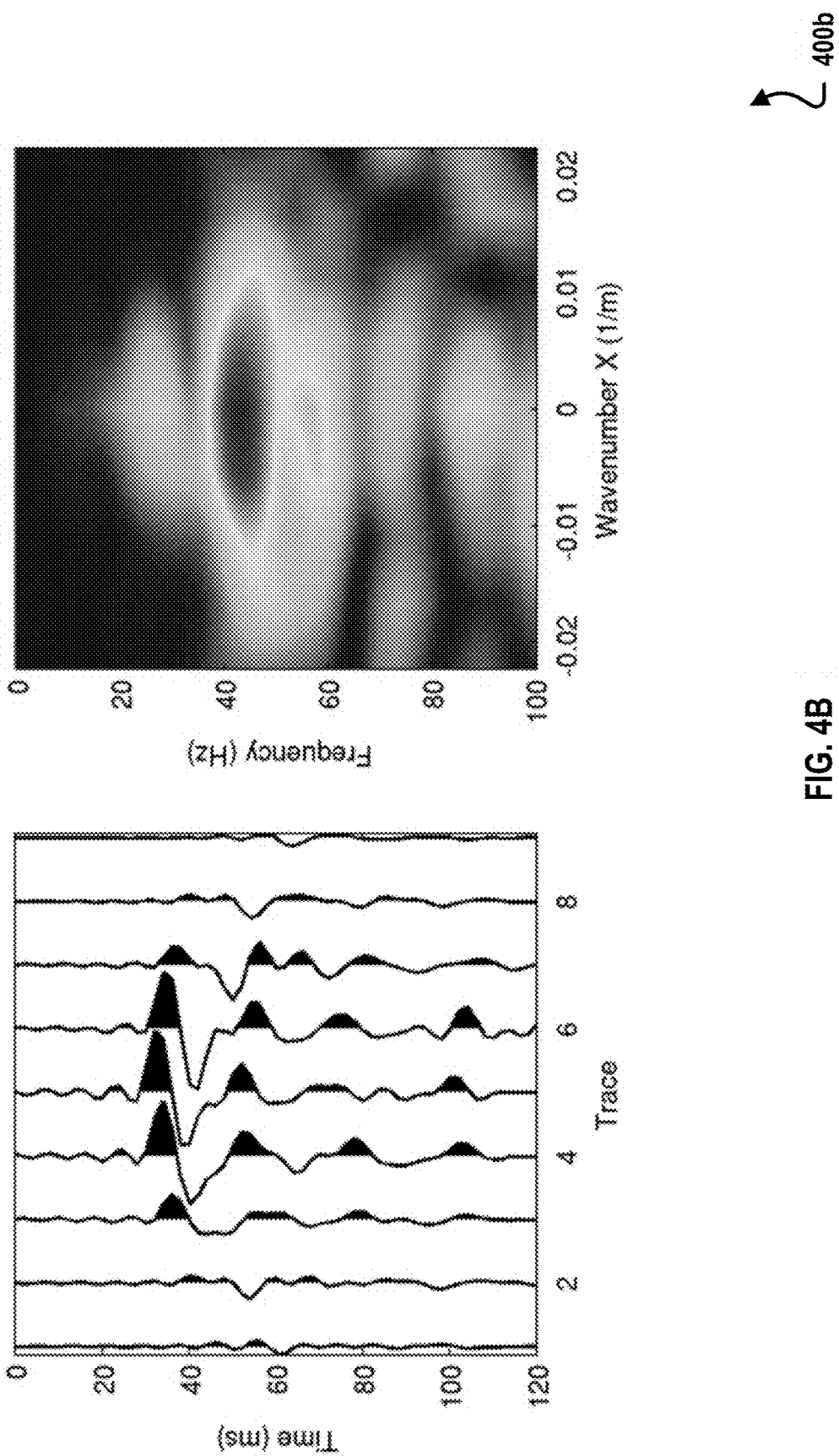

FIG. 4B illustrates data plots 400b following gating (windowing) and spatially-dependent filtering after the operations associated with FIG. 4A, according to an implementation of the present disclosure. As can be seen when compared to FIG. 4A, overall noise in all signal traces has been reduced following the gating and spatially-dependent filtering operations.

Figure 4C:
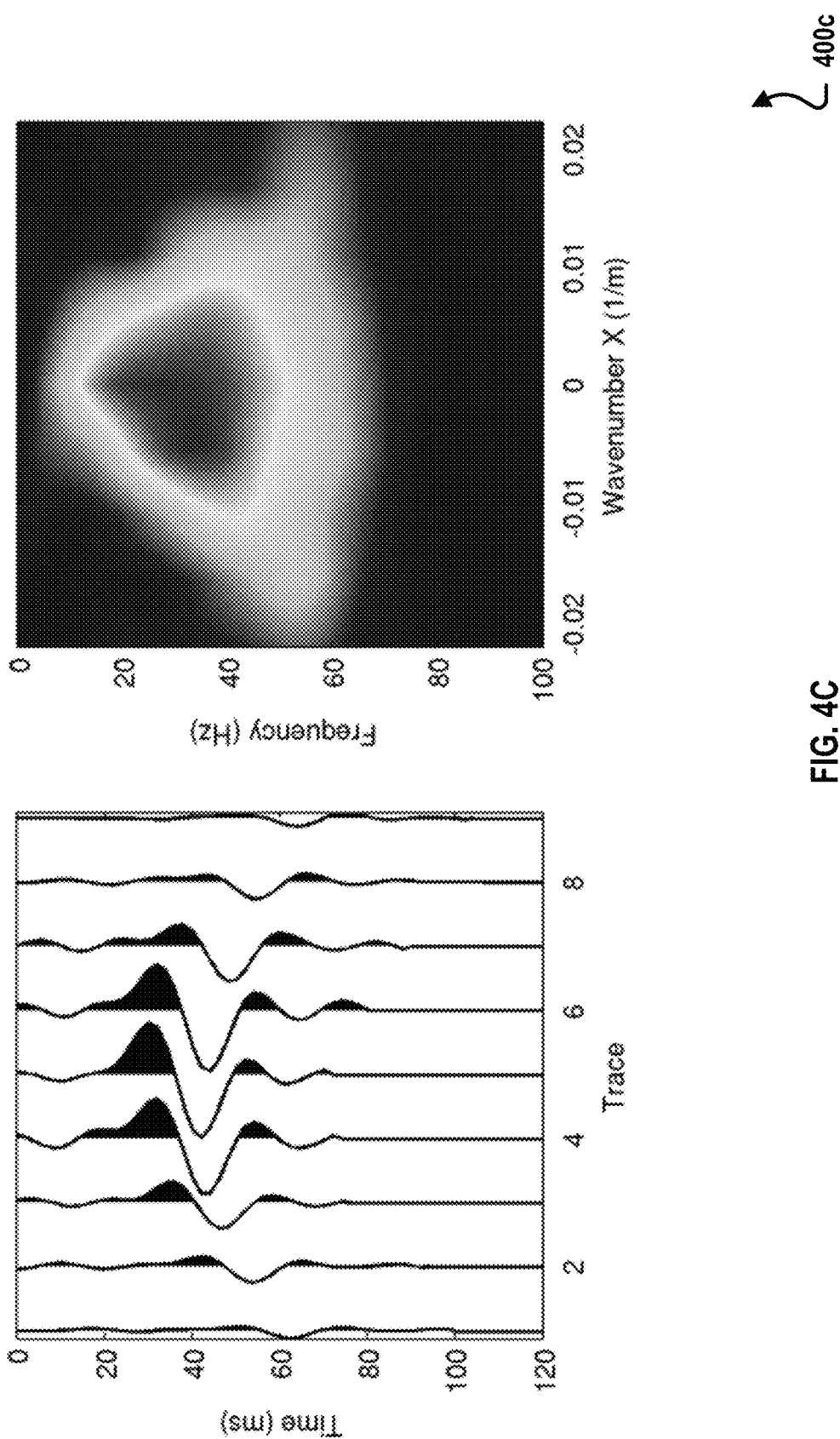

FIG. 4C illustrates data plots 400c following finding and application of a matched filter after the operations associated with FIG. 4B, according to an implementation of the present disclosure. As can be seen when compared to FIG. 4B, overall noise in all signal traces has been further reduced following the finding and application of a matched filter.

Figure 4D:
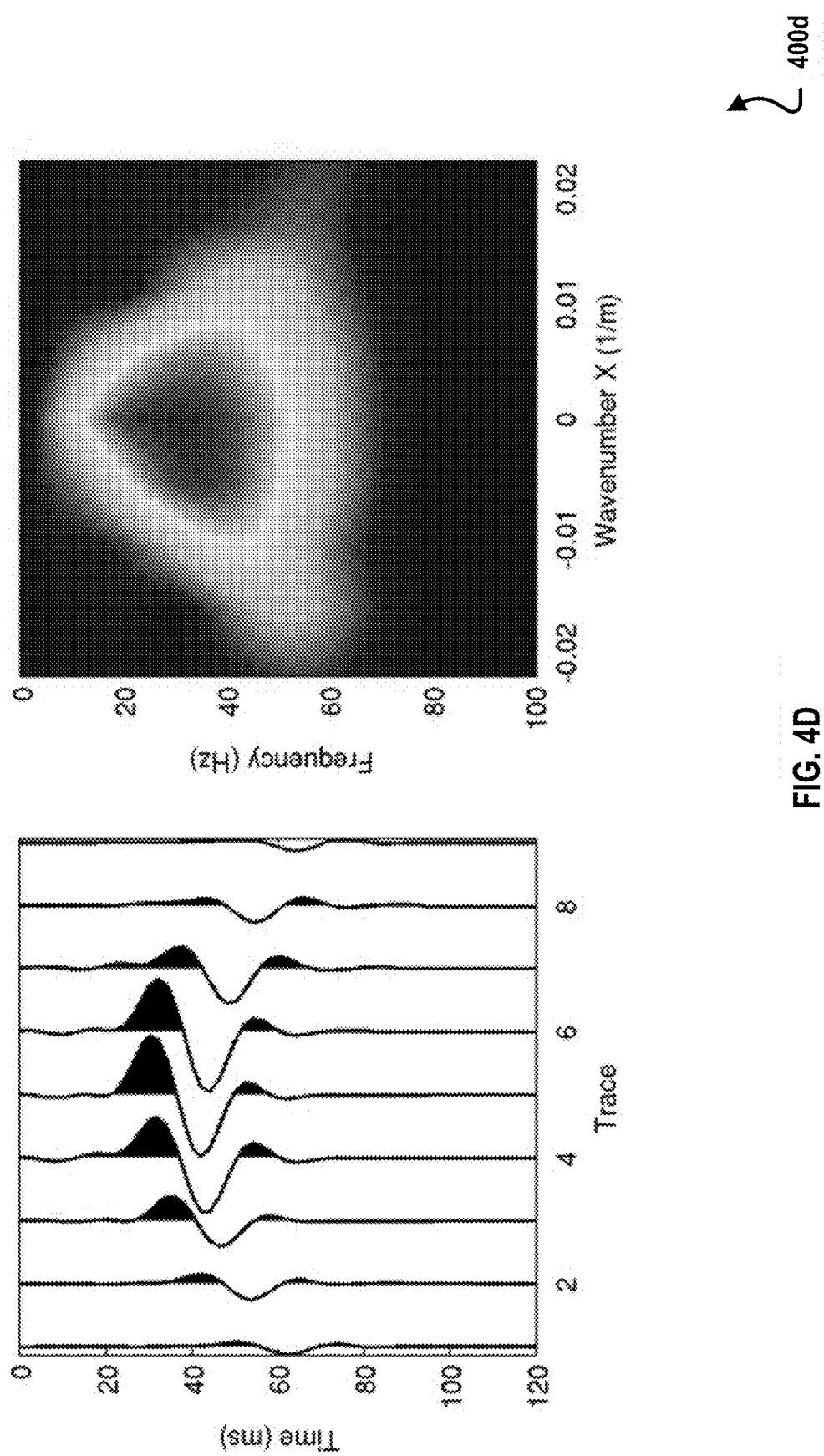

FIG. 4D illustrates data plots 400d following application of time-dependent smoothing plus a matched filter to the windowed and spatially tapered data after the operations associated with FIG. 4C, according to an implementation of the present disclosure. As can be seen when compared to FIG. 4C, overall noise in all signal traces has been further reduced following application of time-dependent smoothing plus a matched filter. The matched filter normalizes spectrum bandwidth across the receiver gather and suppresses coda waves. Time-dependent smoothing further suppresses noises and stabilizes wavelet character.

Figure 4E:
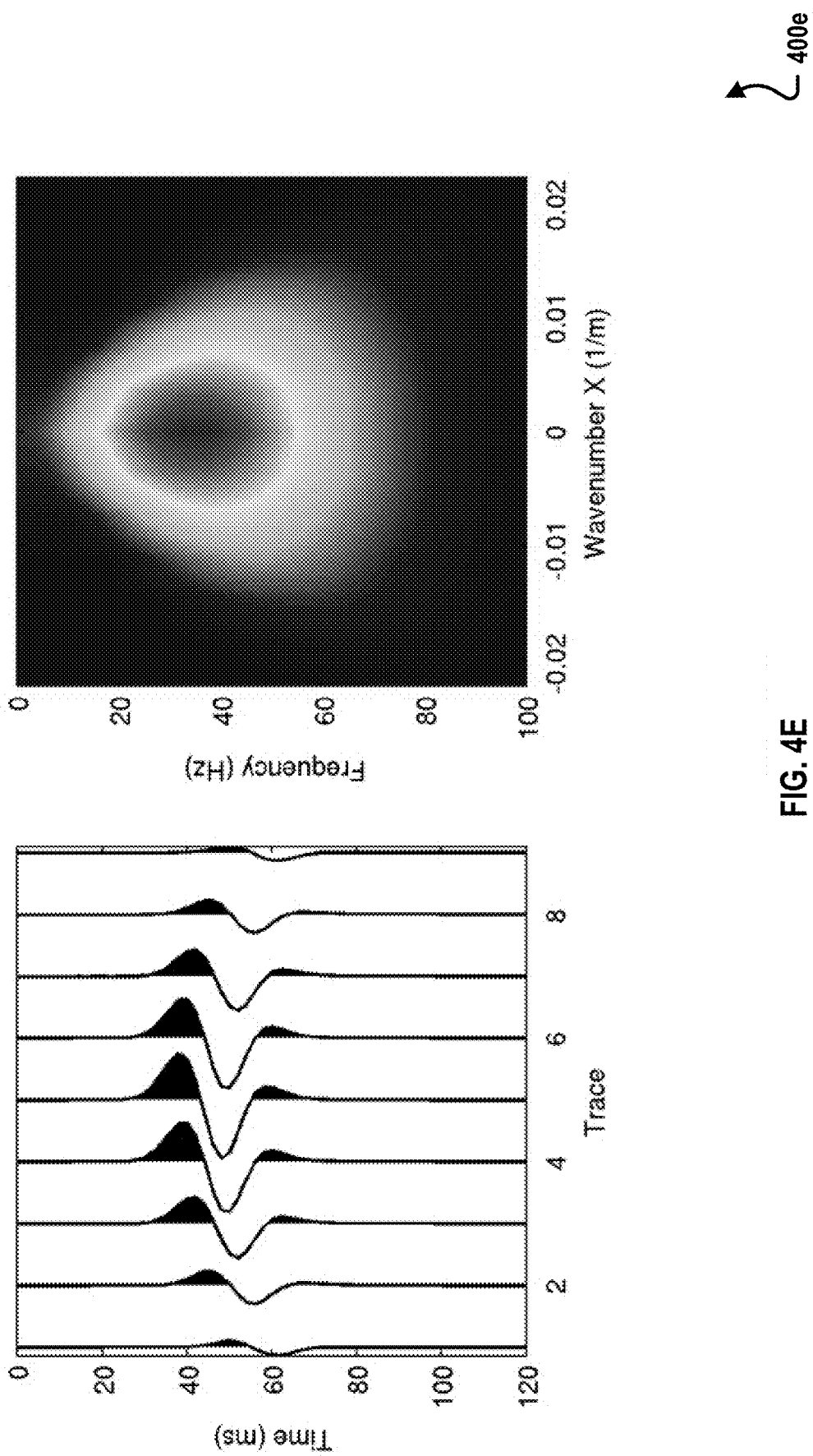
Figure 5B:
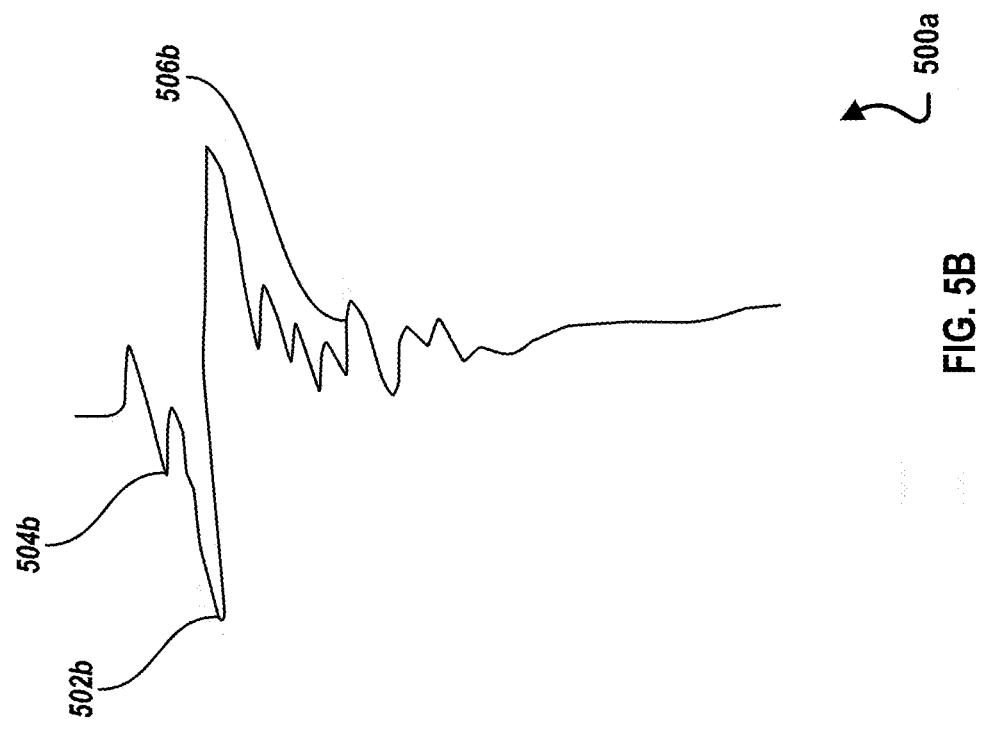
FIGS. 5A and 5B are data plots illustrating example ideal and noisy signals, respectively, according to an implementation of the present disclosure.
Figure 5A:
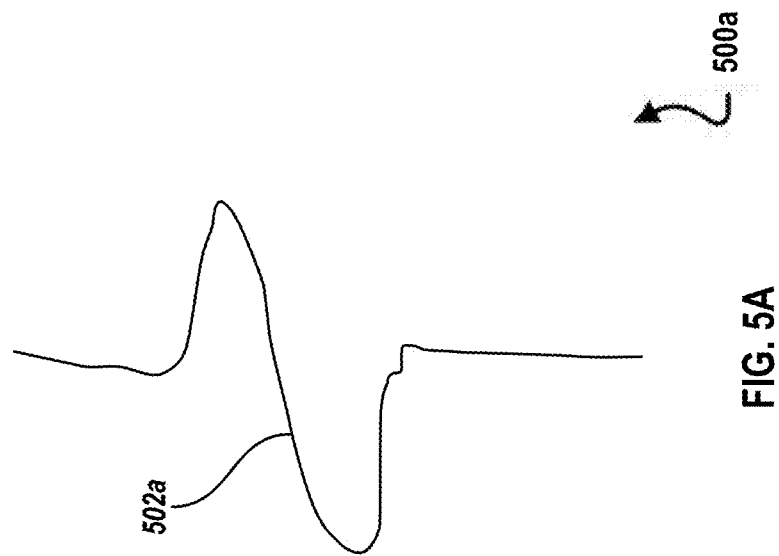

FIG. 4E illustrates data plots 400e following numerically solving an analytic solution for true downgoing P-waves after the operations associated with FIG. 4D, according to an implementation of the present disclosure. As can be seen when compared to FIG. 4D, overall noise in all signal traces has been further reduced to no noise (or to substantially no noise) following numerically solving an analytic solution for true downgoing P-waves. Here the quality of the estimated P-wave as an approximation to the true P-wave is quantified by computing a waveform and its f-k spectrum by replacing overburden by homogenous layers using an analytical solution. As illustrated in FIG. 4E, the downgoing wavefields gradually approach the true P-wave, both in the time-offset domain as well as the frequency-wavenumber domain.

FIGS. 6A-6D are images 600a-600d illustrating plotted common depth point (CDP) stacks of seismic survey data, according to an implementation of the present disclosure. For the example data, multiple (here, thirteen) 2D seismic surveys were conducted in a desert environment. The surveys were acquired prior to a CO2 injection and were used for repeatability study. Output VS records were obtained from post-correlation gathers (horizontal axis) stacked within common offsets. The CDP stack stage included a minor static correction to flat datum, normal move out, trace-by-trace amplitude balancing, and mute. The displayed time interval (vertical axis) is from 0 ms to 1900 ms with timing lines every 100 ms. Circle 602 in FIGS. 6A-6D indicates the target reservoir of each space location.

Figure 6A:
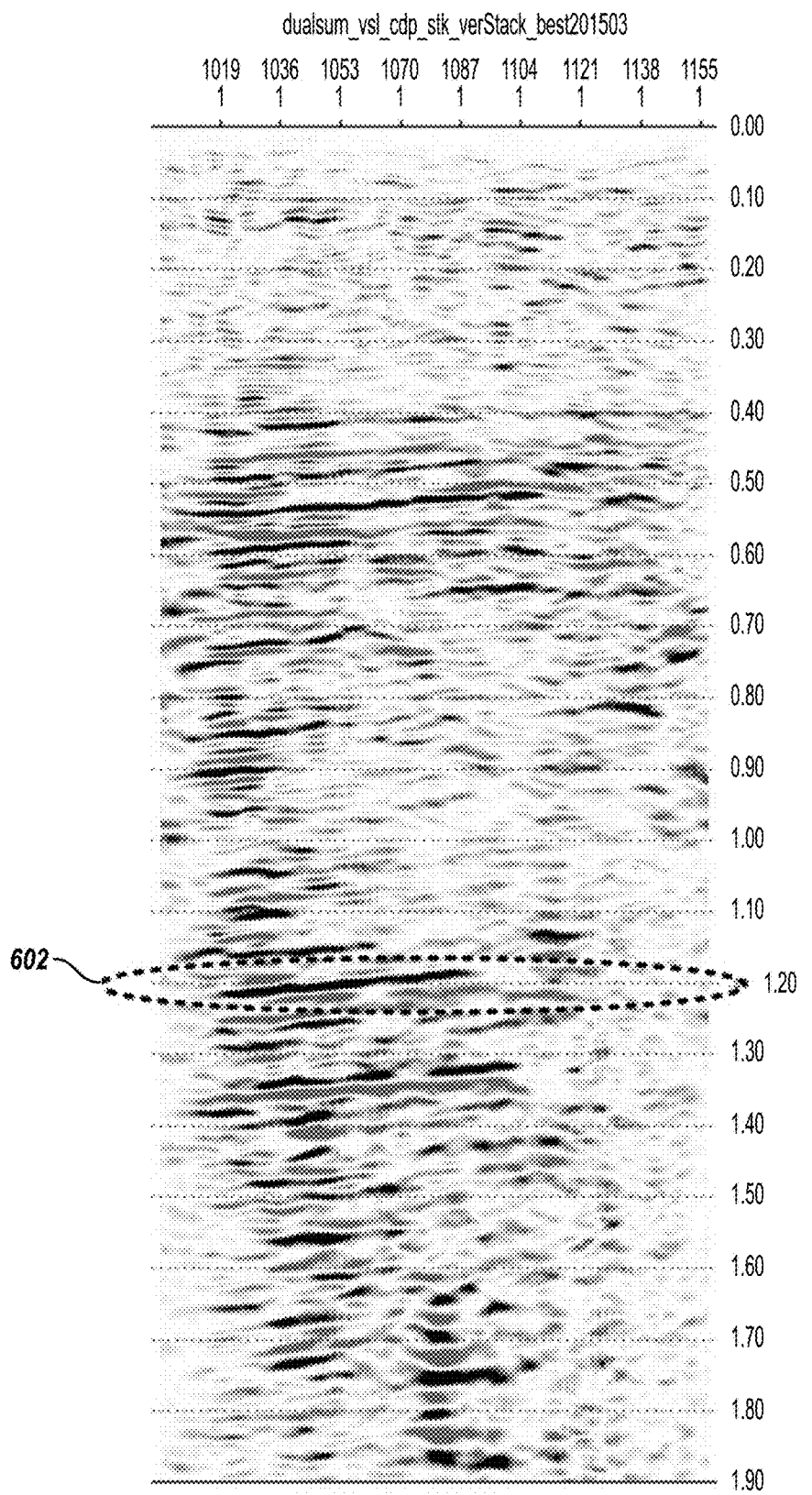
FIGS. 6A-6D are images illustrating plotted common depth point (CDP) stacks of seismic survey data, according to an implementation of the present disclosure.

FIG. 6A illustrates a data plot 600a of a non-VS control section, according to an implementation of the present disclosure. FIG. 6A illustrates good signal continuity on several reflectors.

Figure 6B:
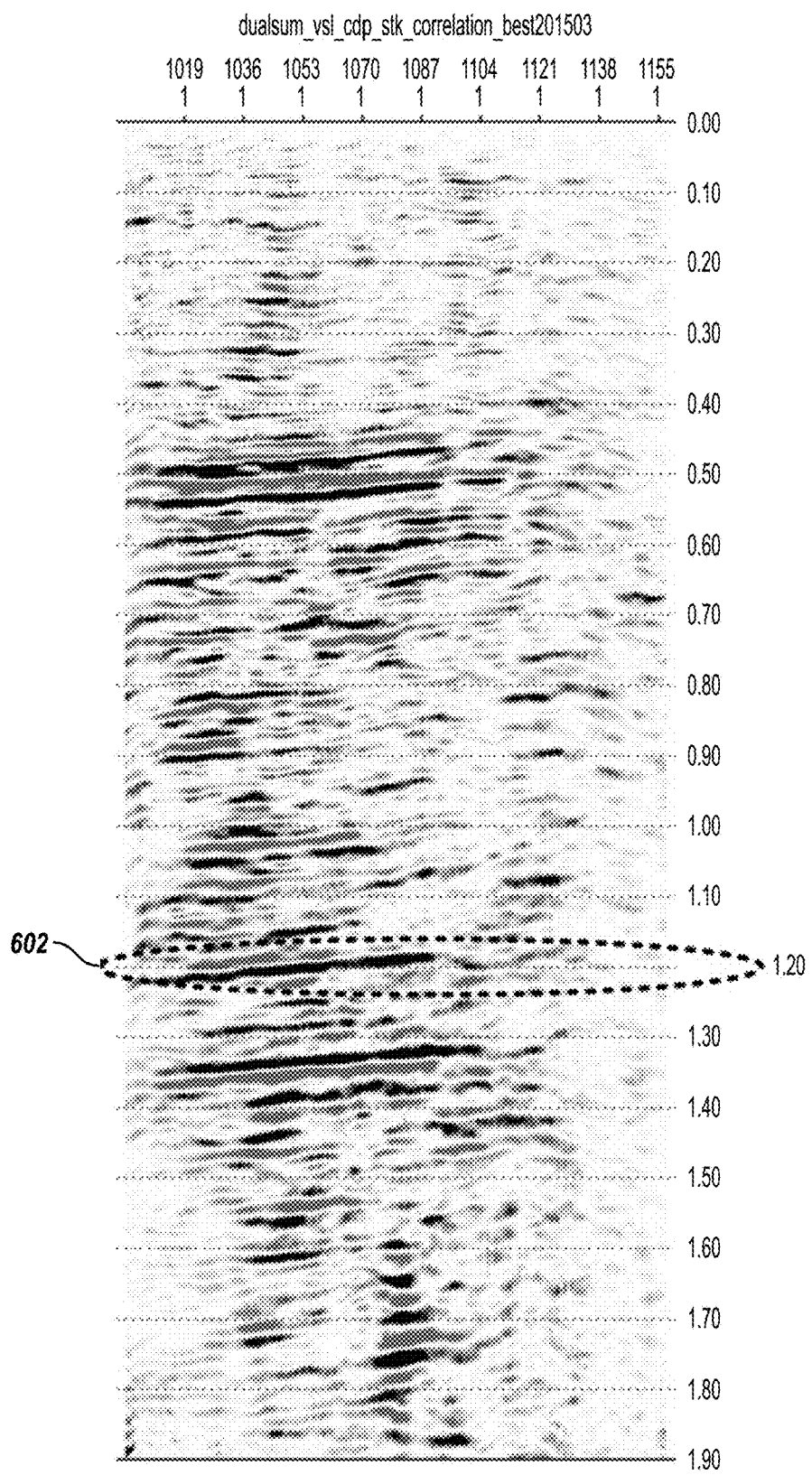

FIG. 6B illustrates a data plot 600b after using a traditional VS with the data of FIG. 6A, according to an implementation of the present disclosure. Added noise is visible with the use of the traditional VS.

Figure 6C:
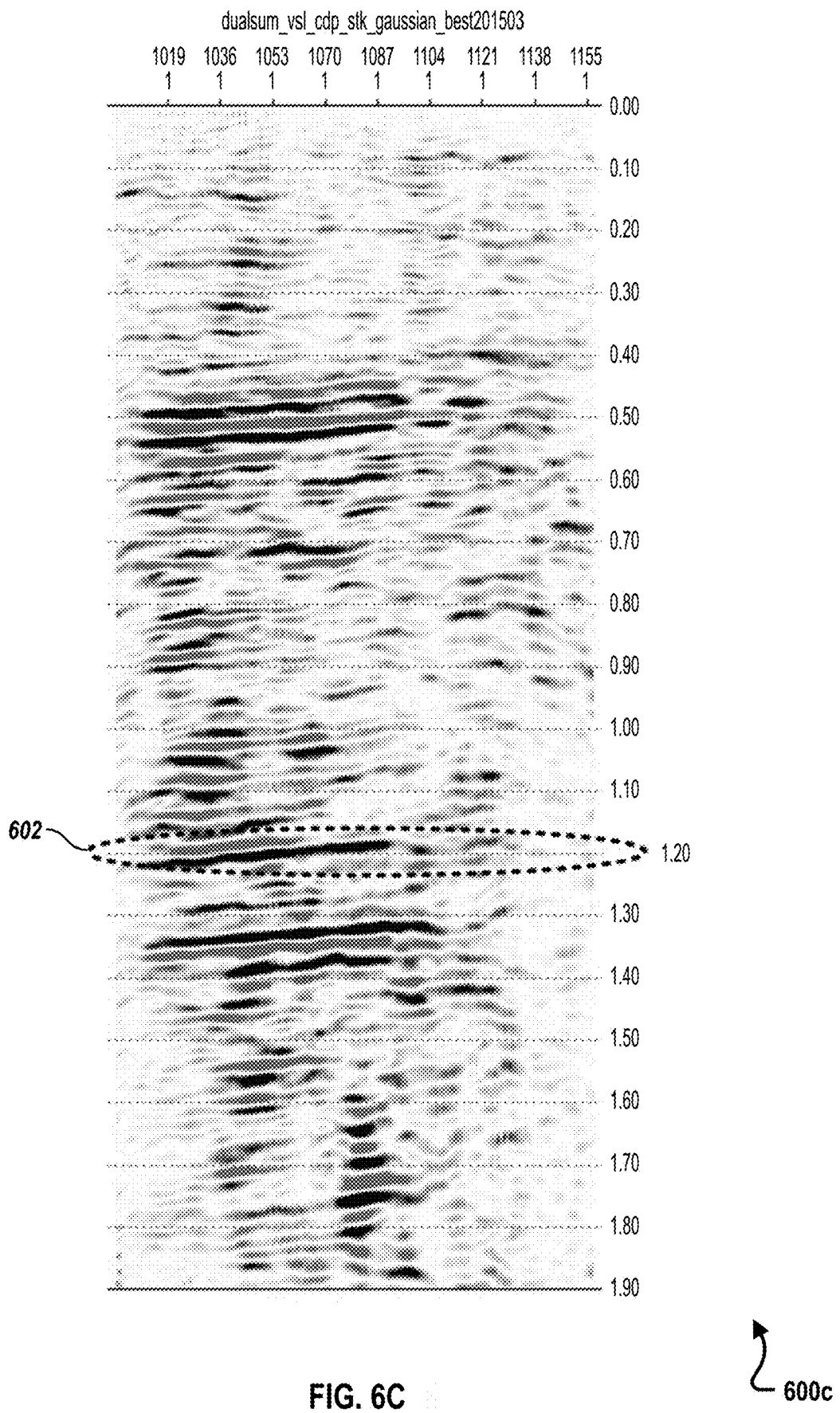

FIG. 6C illustrates a data plot 600c after using VS with a matched filter with the data of FIG. 6A, according to an implementation of the present disclosure. Note that overall noise is reduced but that the response is similar to that of FIG. 6A.

Figure 6D:
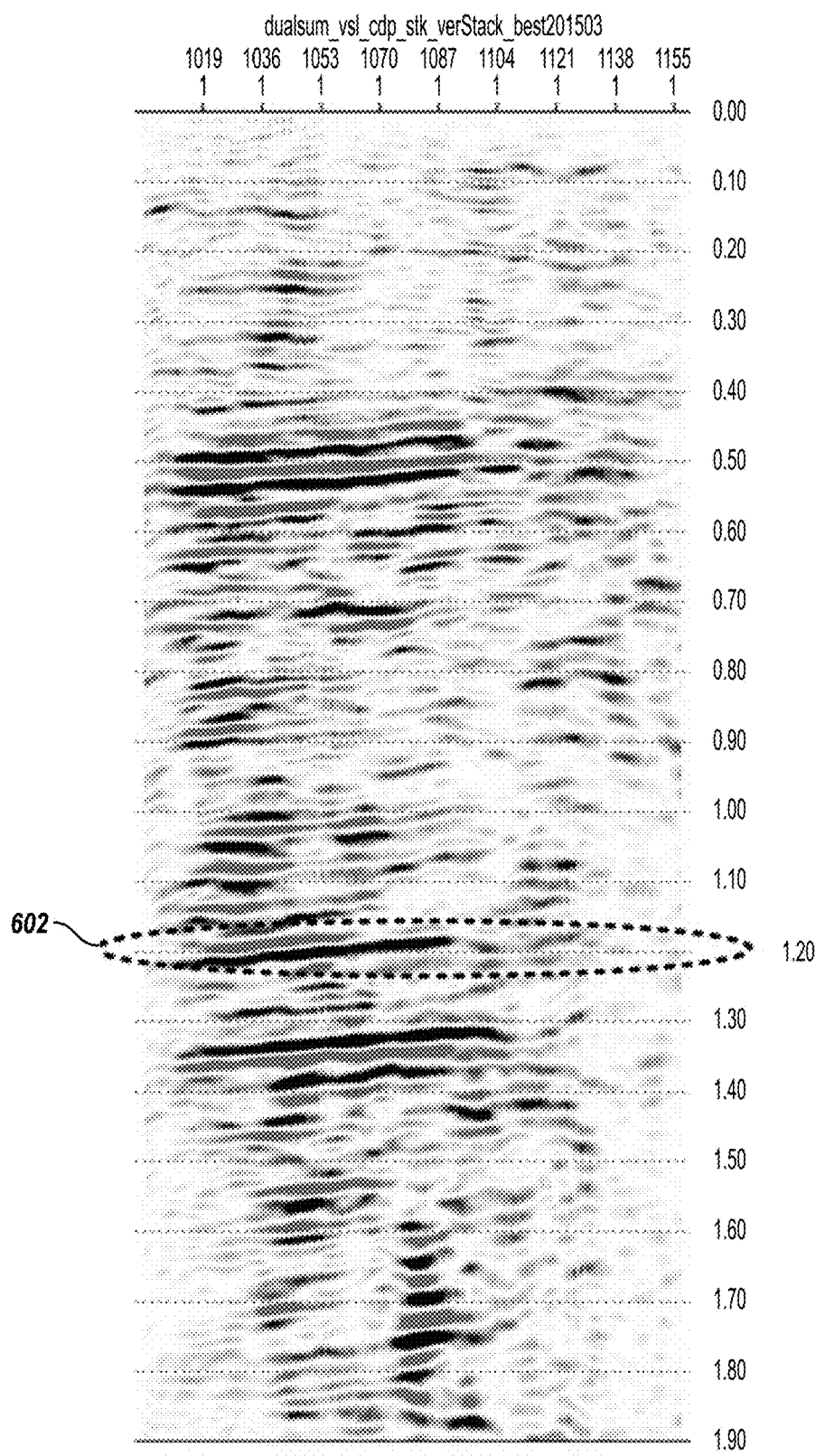

FIG. 6D illustrates a data plot 600d using VS with a matched filter plus time-dependent smoothing with the data of FIG. 6A, according to an implementation of the present disclosure. FIG. 6D illustrates an improved signal-to-noise ratio, best continuity, and strongest signal when compared to that of data plots 600b or 600c.

FIGS. 7A-7D are images 700a-700d illustrating plotted common depth point (CDP) traces for each of thirteen sample seismic surveys from 1120 ms to 1300 ms, according to an implementation of the present disclosure. The displayed time interval (vertical axis) is from 0 ms to 1900 ms with timing lines every 100 ms. For the example data, a repeatability issue is illustrated between surveys S1-S6 and S7-S13 (horizontal axis) in the non-VS control section, particularly at an indicated target reservoir (for example, circle 702 in FIGS. 7A-7D). Circle 702 indicates a waveform of a target reservoir collected from the previously-mentioned thirteen seismic surveys. Application of processing flows including VS with a matched filter appear to have improved repeatability at the target reservoir level.

Figure 7A:
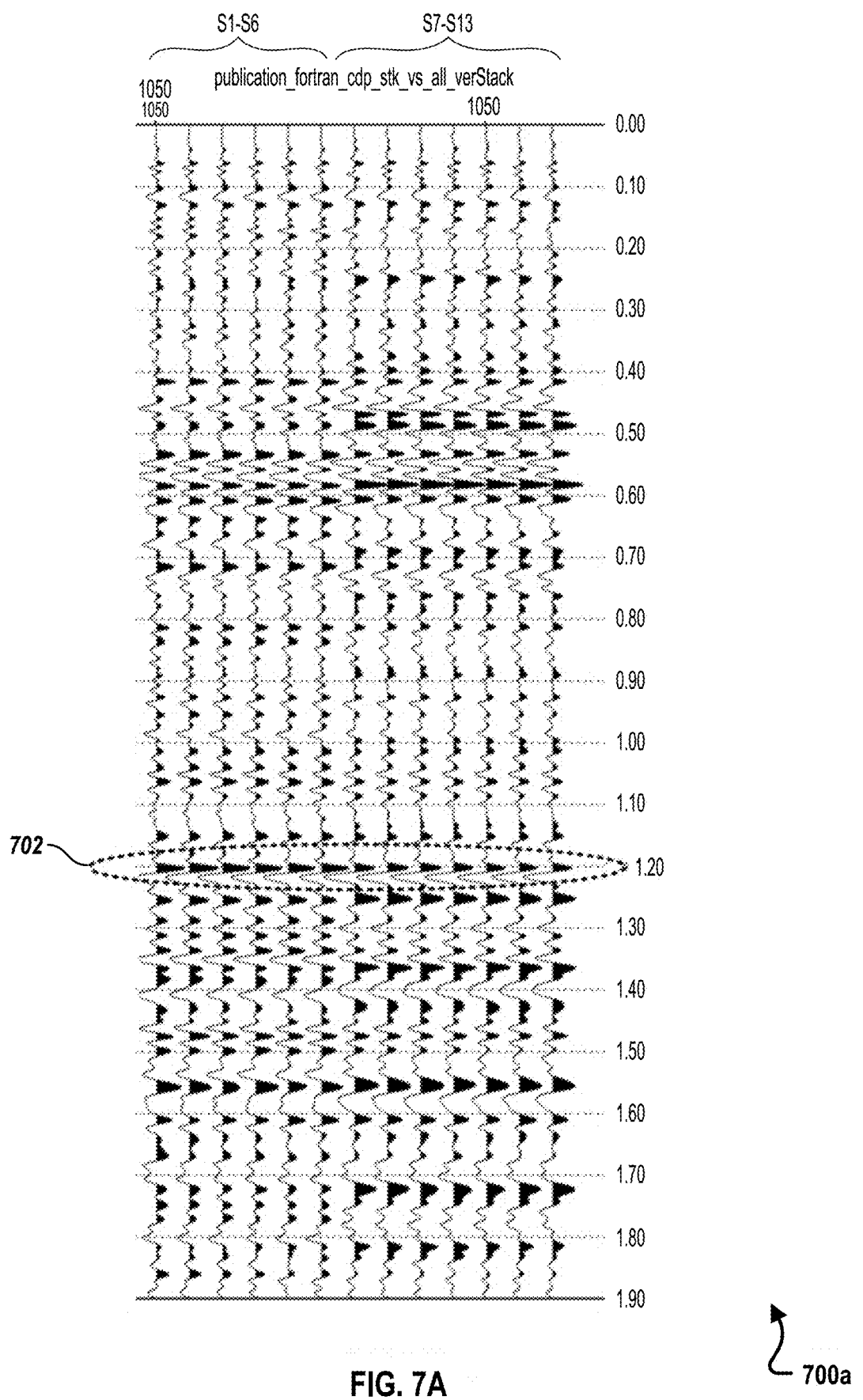
FIGS. 7A-7D are images illustrating plotted common depth point (CDP) traces for each of thirteen sample seismic surveys from 1120 (milliseconds (ms)) to 1300 ms, according to an implementation of the present disclosure.

FIG. 7A illustrates a data plot 700a of a non-VS, according to an implementation of the present disclosure. Note the repeatability issue illustrated in the indicated target reservoir (circle 702) between surveys S1-S6 and S7-S13.

Figure 7B:
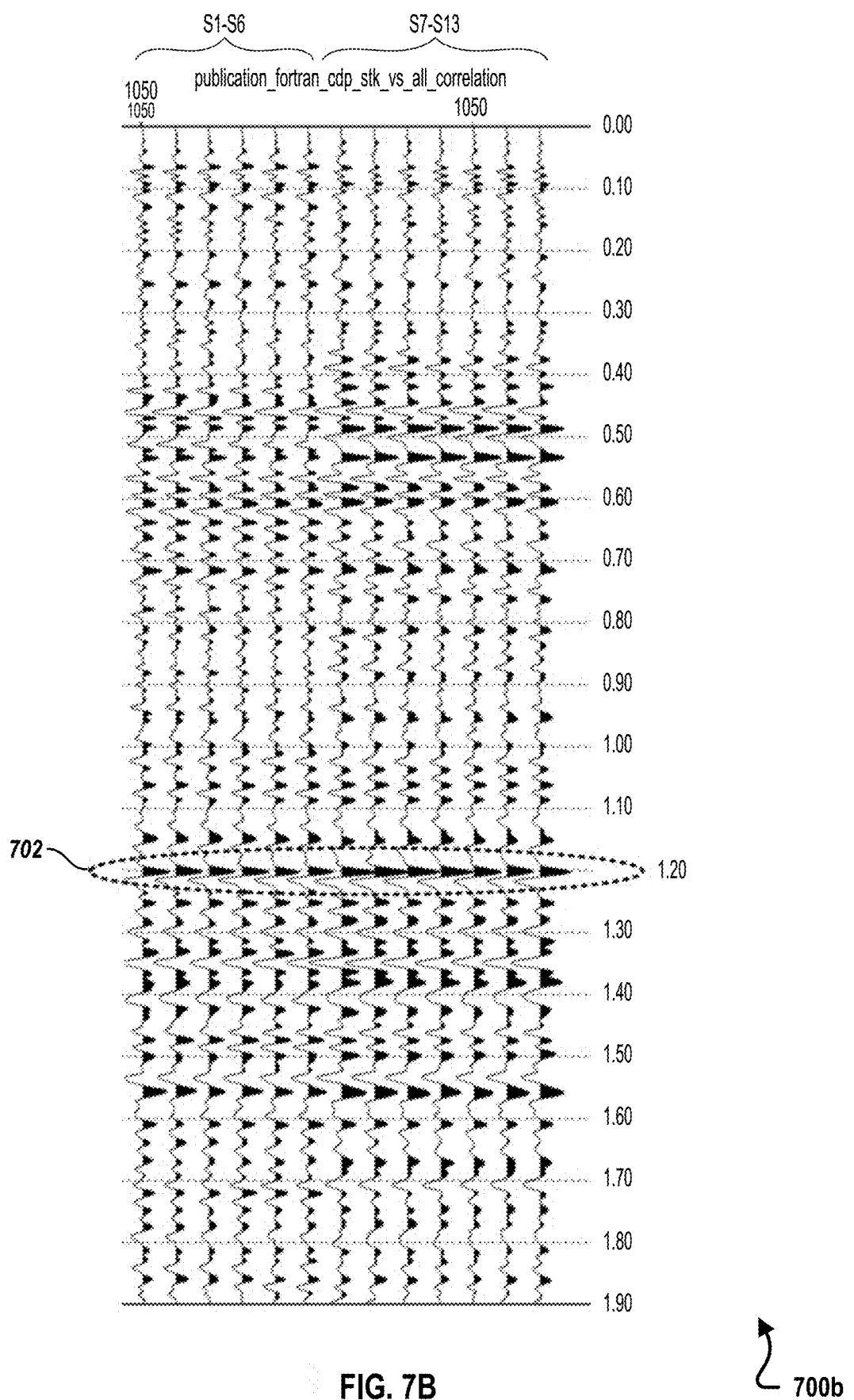

FIG. 7B illustrates a data plot 700b after using a traditional VS with the data of FIG. 7A, according to an implementation of the present disclosure. Added noise is visible with the use of the traditional VS.

Figure 7C:
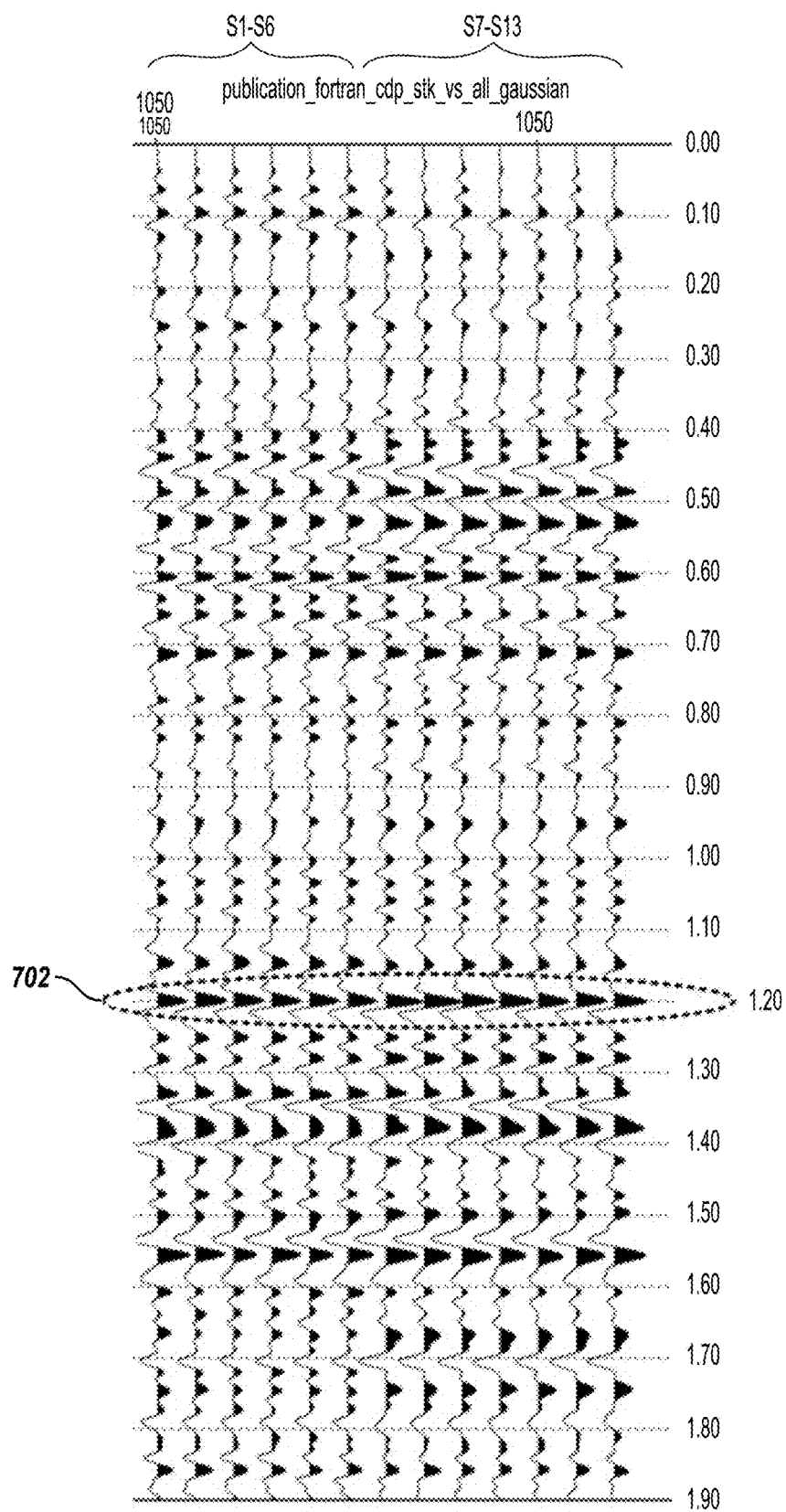

FIG. 7C illustrates a data plot 700c after using VS with matched filter with the data of FIG. 7A, according to an implementation of the present disclosure. Note that overall noise is reduced but that the response is similar to that of FIG. 7A.

Figure 7D:
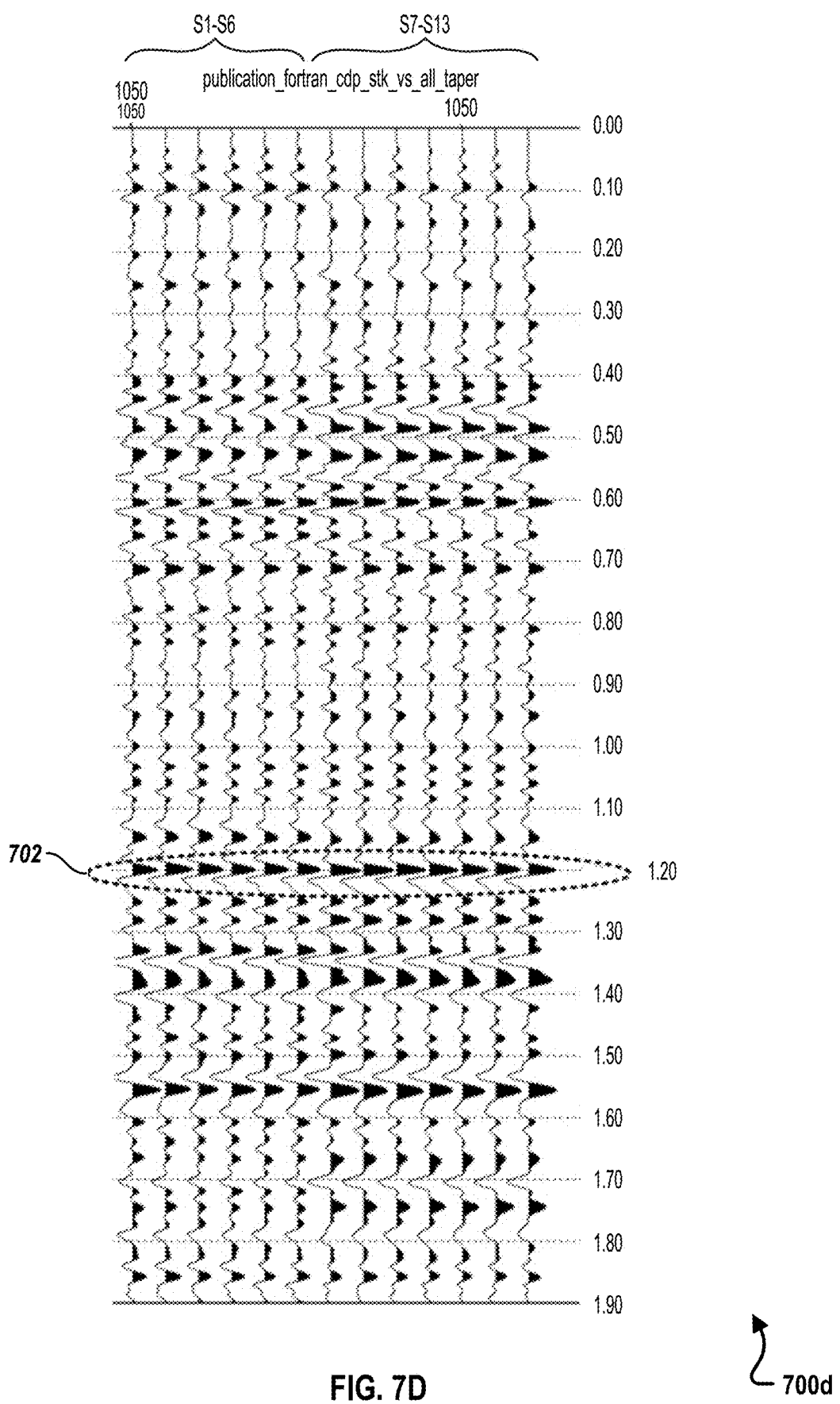

FIG. 7D illustrates a data plot 700d after using VS with a matched filter plus time-dependent smoothing with the data of FIG. 7A. FIG. 7D illustrates the best repeatability among FIGS. 7A-7D.

The observations of FIGS. 4A-4E, 6A-6D, and 7A-7D can be quantified using a normalized root-mean-squares (NRMS) computed within a short window around the indicated reservoir. No baseline is specified as NRMS is computed between all example surveys. Considering thirteen surveys in total, this represents 68 NRMS combinations at each CDP.

Figure 8:
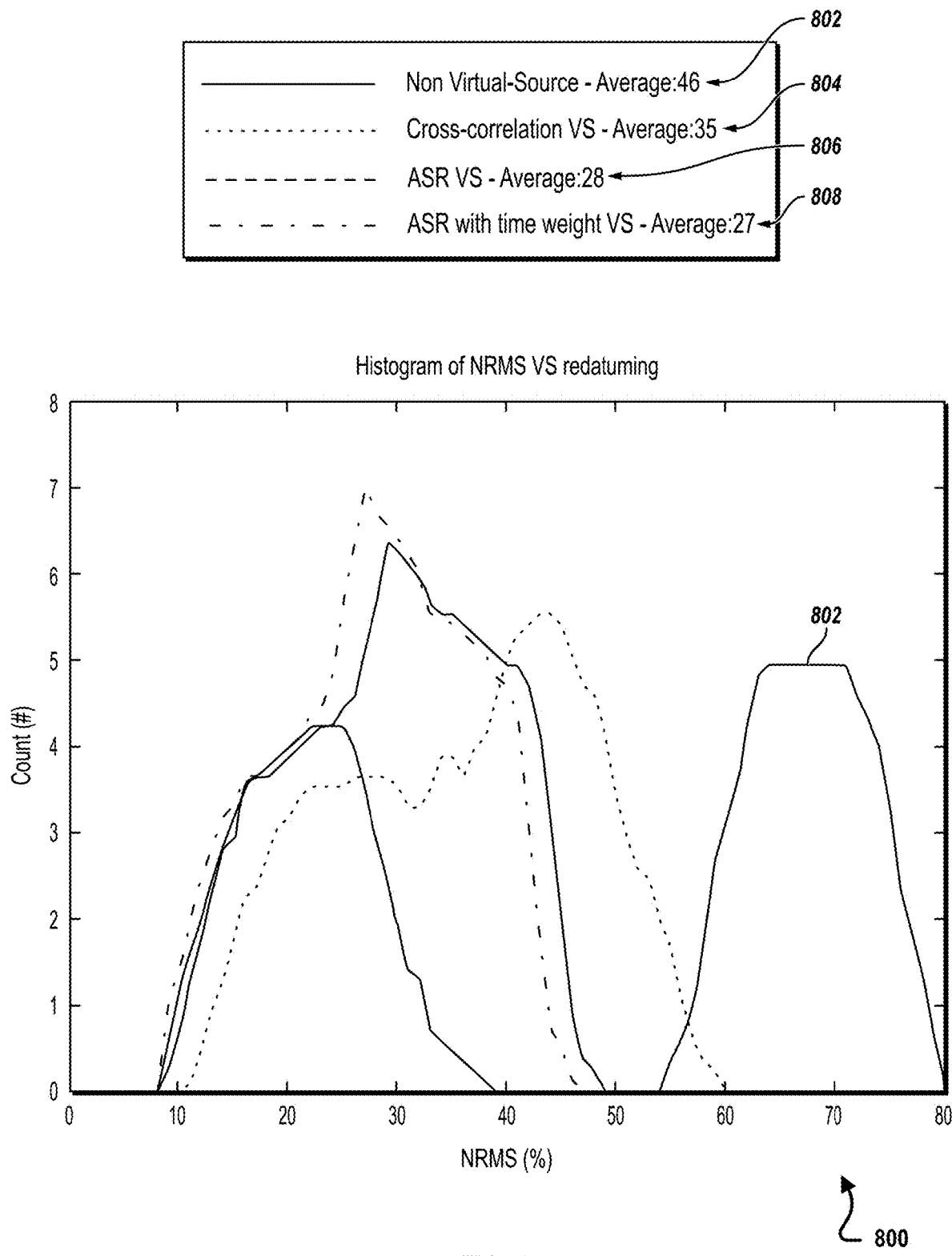
FIG. 8 is a graph illustrating histograms of normalized root-mean-squares (NRMS) values associated with each method, according to an implementation of the present disclosure.

FIG. 8 is a graph 800 illustrating histograms of NRMS values associated with each method, according to an implementation of the present disclosure. The non-VS control section 802 (blue line) illustrates a bi-modal NRMS distribution (40% changes) in seventeen months separating surveys S1-S6 and S7-S13. A similar distribution, though narrower than non-VS, is also observed by traditional VS 804 (red line). Amplitude Spectrum Replacement (ASR) VS 806 (black line) (VS with matched filter) and ASR with time weight VS 808 (light blue line) (VS with matched filter plus time-dependent smoothing) substantially decrease NRMS to a single peak at 29% (that is, VS with matched filter plus time-dependent smoothing has smallest NRMS values among all four datasets, indicating an improved repeatability). A median value of distribution is displayed in the legends. These results support observations made in FIGS. 4A-4E and FIGS. 6A-6D and illustrate how VS with matched filter dramatically reduces non-repeatability between seismic surveys separated by a multi-month time gap.

Figure 9:
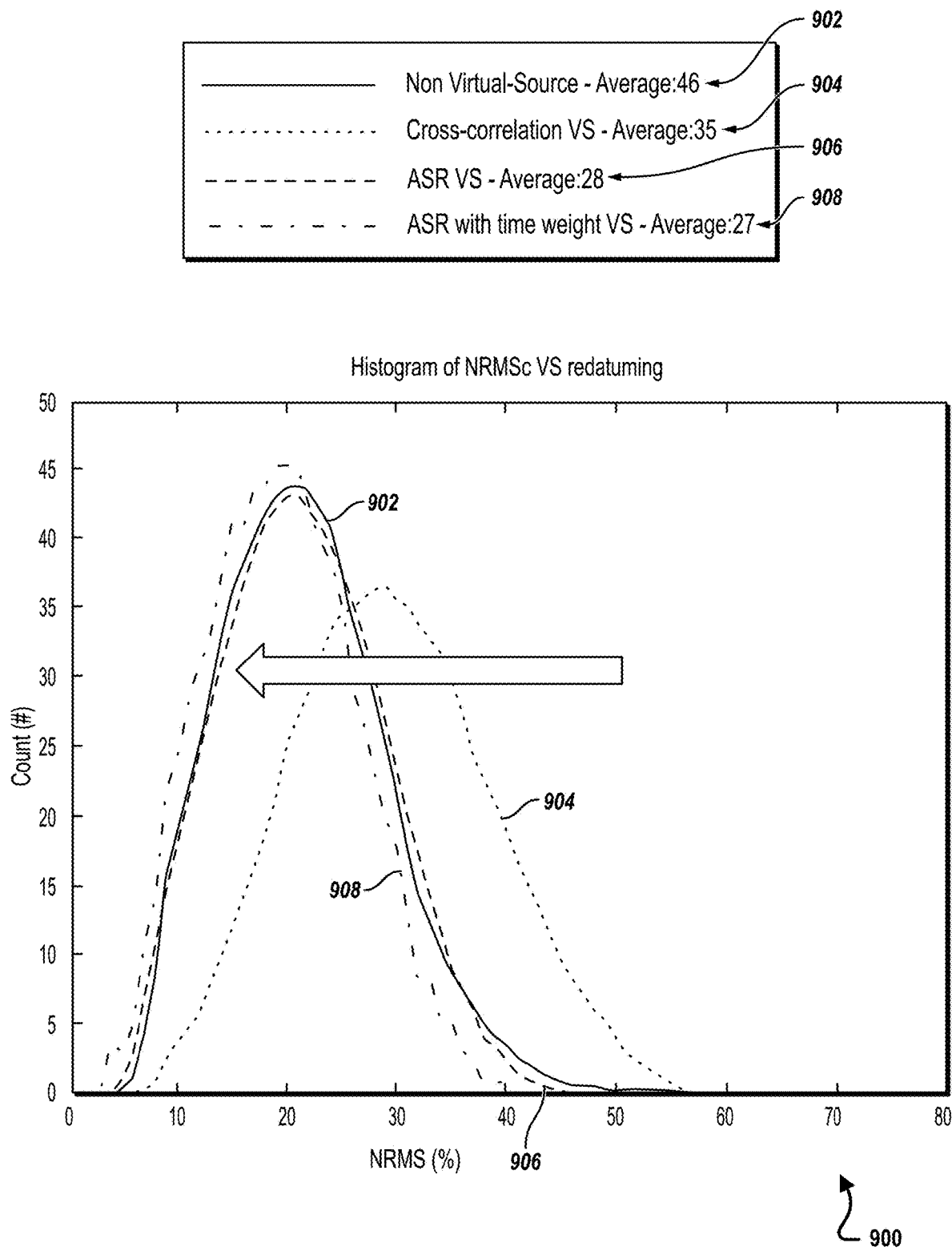
FIG. 9 is a graph illustrating a comparison of image quality between downgoing direct P-wave approximations by calculating NRMS between adjacent CDPs (NRMSc), according to an implementation of the present disclosure.

FIG. 9 is a graph 900 illustrating a comparison of image quality between downgoing direct P-wave approximations by calculating NRMS between adjacent CDPs (NRMSc), according to an implementation of the present disclosure. This new continuity metric (NRMSc) is useful in that it has the same input time window and same units as NRMS and is designed to measure continuity of image reflectors. As illustrated, VS with matched filter plus time-dependent smoothing has the smallest NRMSc values. A windowed traditional VS 904 (red line) stands out as a poorer image compared with the other three distributions (non-VS control section 902 (blue line), ASR VS 906 (black line) (VS with matched filter), and ASR with time weight VS 908 (light blue line) (VS with matched filter plus time-dependent smoothing)). This is consistent with the observations made in FIGS. 6A-6D. Image continuity improves moving to the left in the graph 900.

Figure 10:
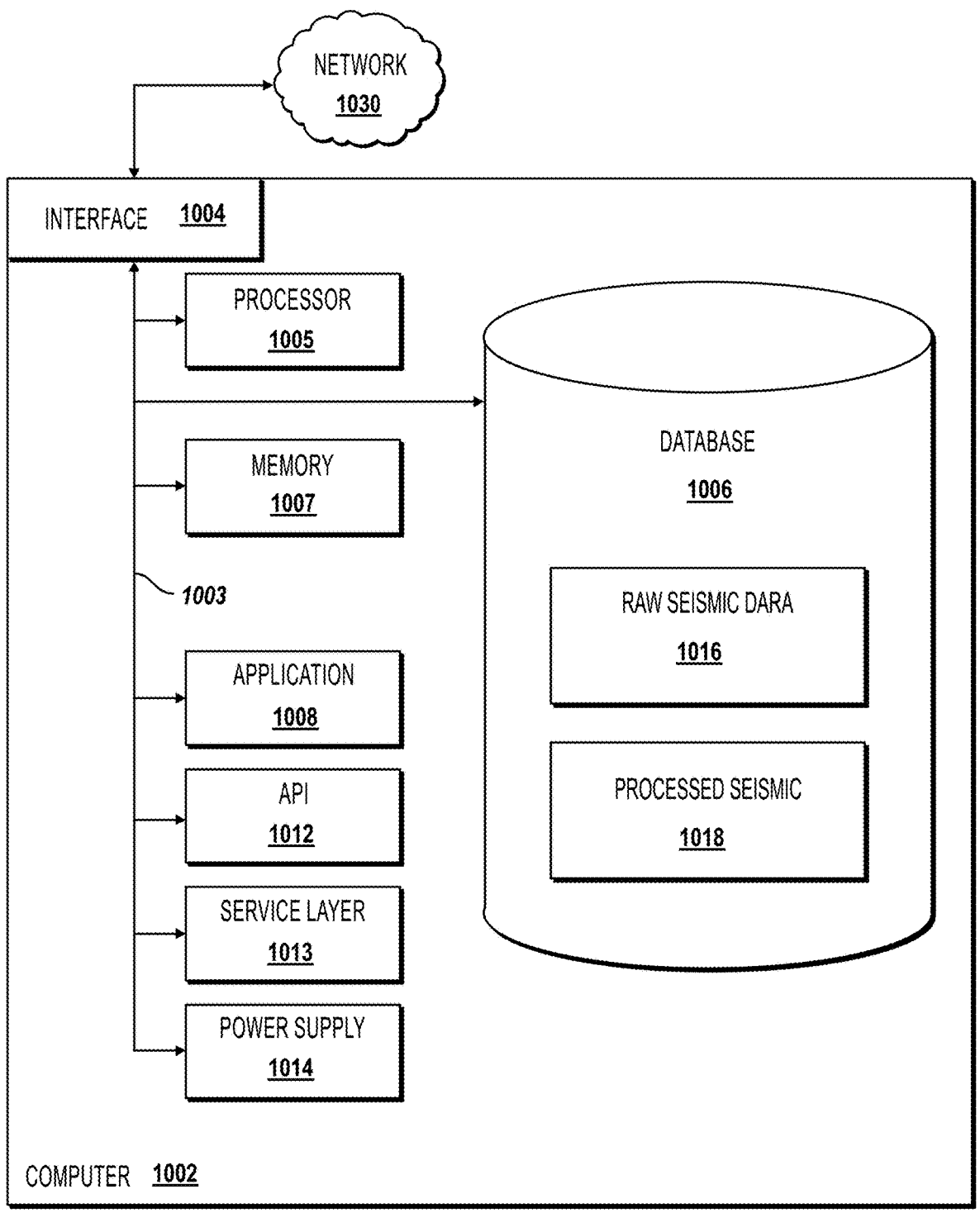
FIG. 10 is a block diagram illustrating an exemplary computer system used to provide computational functionalities associated with described algorithms, methods, functions, processes, flows, and procedures, as described in the instant disclosure, according to an implementation of the present disclosure.

FIG. 10 is a block diagram illustrating an example of a computer-implemented System 1000 used to provide computational functionalities associated with described algorithms, methods, functions, processes, flows, and procedures, according to an implementation of the present disclosure. In the illustrated implementation, System 1000 includes a Computer 1002 and a Network 1030.

The illustrated Computer 1002 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 1002 can include an input device, such as a keypad, keyboard, touch screen, another input device, or a combination of input devices that can accept user information, and an output device that conveys information associated with the operation of the Computer 1002, including digital data, visual, audio, another type of information, or a combination of types of information, on a graphical-type user interface (UI) (or GUI) or other UI.

The Computer 1002 can serve in a role in a distributed computing system as a client, network component, a server, a database or another persistency, another role, or a combination of roles for performing the subject matter described in the present disclosure. The illustrated Computer 1002 is communicably coupled with a Network 1030. In some implementations, one or more components of the Computer 1002 can be configured to operate within an environment, including cloud-computing-based, local, global, another environment, or a combination of environments.

At a high level, the Computer 1002 is an electronic computing device operable to receive, transmit, process, store, or manage data and information associated with the described subject matter. According to some implementations, the Computer 1002 can also include or be communicably coupled with a server, including an application server, e-mail server, web server, caching server, streaming data server, another server, or a combination of servers.

The Computer 1002 can receive requests over Network 1030 (for example, from a client software application executing on another Computer 1002) and respond to the received requests by processing the received requests using a software application or a combination of software applications. In addition, requests can also be sent to the Computer 1002 from internal users (for example, from a command console or by another internal access method), external or third-parties, or other entities, individuals, systems, or computers.

Each of the components of the Computer 1002 can communicate using a System Bus 1003. In some implementations, any or all of the components of the Computer 1002, including hardware, software, or a combination of hardware and software, can interface over the System Bus 1003 using an application programming interface (API) 1012, a Service Layer 1013, or a combination of the API 1012 and Service Layer 1013. The API 1012 can include specifications for routines, data structures, and object classes. The API 1012 can be either computer-language independent or dependent and refer to a complete interface, a single function, or even a set of APIs. The Service Layer 1013 provides software services to the Computer 1002 or other components (whether illustrated or not) that are communicably coupled to the Computer 1002. The functionality of the Computer 1002 can be accessible for all service consumers using the Service Layer 1013. Software services, such as those provided by the Service Layer 1013, provide reusable, defined functionalities through a defined interface. For example, the interface can be software written in JAVA, C++, another computing language, or a combination of computing languages providing data in extensible markup language (XML) format, another format, or a combination of formats.

While illustrated as an integrated component of the Computer 1002, alternative implementations can illustrate the API 1012 or the Service Layer 1013 as stand-alone components in relation to other components of the Computer 1002 or other components (whether illustrated or not) that are communicably coupled to the Computer 1002. Moreover, any or all parts of the API 1012 or the Service Layer 1013 can be implemented as a child or a sub-module of another software module, enterprise application, or hardware module without departing from the scope of the present disclosure.

The Computer 1002 includes an Interface 1004. Although illustrated as a single Interface 1004, two or more Interfaces 1004 can be used according to particular needs, desires, or particular implementations of the Computer 1002. The Interface 1004 is used by the Computer 1002 for communicating with another computing system (whether illustrated or not) that is communicatively linked to the Network 1030 in a distributed environment. Generally, the Interface 1004 is operable to communicate with the Network 1030 and includes logic encoded in software, hardware, or a combination of software and hardware. More specifically, the Interface 1004 can include software supporting one or more communication protocols associated with communications such that the Network 1030 or hardware of Interface 1004 is operable to communicate physical signals within and outside of the illustrated Computer 1002.

The Computer 1002 includes a Processor 1005. Although illustrated as a single Processor 1005, two or more Processors 1005 can be used according to particular needs, desires, or particular implementations of the Computer 1002. Generally, the Processor 1005 executes instructions and manipulates data to perform the operations of the Computer 1002 and any algorithms, methods, functions, processes, flows, and procedures as described in the present disclosure.

The Computer 1002 also includes a Database 1006 that can hold data for the Computer 1002, another component communicatively linked to the Network 1030 (whether illustrated or not), or a combination of the Computer 1002 and another component. For example, Database 1006 can be an in-memory, conventional, or another type of database storing data consistent with the present disclosure. In some implementations, Database 1006 can be a combination of two or more different database types (for example, a hybrid in-memory and conventional database) according to particular needs, desires, or particular implementations of the Computer 1002 and the described functionality. Although illustrated as a single Database 1006, two or more databases of similar or differing types can be used according to particular needs, desires, or particular implementations of the Computer 1002 and the described functionality. While Database 1006 is illustrated as an integral component of the Computer 1002, in alternative implementations, Database 1006 can be external to the Computer 1002. As illustrated, the database 1006 holds Raw Seismic Data 1016 (for example, shot gathers) and Processed Seismic Images 1018 (for example, a VS shot gather).

The Computer 1002 also includes a Memory 1007 that can hold data for the Computer 1002, another component or components communicatively linked to the Network 1030 (whether illustrated or not), or a combination of the Computer 1002 and another component. Memory 1007 can store any data consistent with the present disclosure. In some implementations, Memory 1007 can be a combination of two or more different types of memory (for example, a combination of semiconductor and magnetic storage) according to particular needs, desires, or particular implementations of the Computer 1002 and the described functionality. Although illustrated as a single Memory 1007, two or more Memories 1007 or similar or differing types can be used according to particular needs, desires, or particular implementations of the Computer 1002 and the described functionality. While Memory 1007 is illustrated as an integral component of the Computer 1002, in alternative implementations, Memory 1007 can be external to the Computer 1002.

The Application 1008 is an algorithmic software engine providing functionality according to particular needs, desires, or particular implementations of the Computer 1002, particularly with respect to functionality described in the present disclosure. For example, Application 1008 can serve as one or more components, modules, or applications. Further, although illustrated as a single Application 1008, the Application 1008 can be implemented as multiple Applications 1008 on the Computer 1002. In addition, although illustrated as integral to the Computer 1002, in alternative implementations, the Application 1008 can be external to the Computer 1002.

The Computer 1002 can also include a Power Supply 1014. The Power Supply 1014 can include a rechargeable or non-rechargeable battery that can be configured to be either user- or non-user-replaceable. In some implementations, the Power Supply 1014 can include power-conversion or management circuits (including recharging, standby, or another power management functionality). In some implementations, the Power Supply 1014 can include a power plug to allow the Computer 1002 to be plugged into a wall socket or another power source to, for example, power the Computer 1002 or recharge a rechargeable battery.

There can be any number of Computers 1002 associated with, or external to, a computer system containing Computer 1002, each Computer 1002 communicating over Network 1030. Further, the term "client," "user," or other appropriate terminology can be used interchangeably, as appropriate, without departing from the scope of the present disclosure. Moreover, the present disclosure contemplates that many users can use one Computer 1002, or that one user can use multiple computers 1002.

With the described methodology, computational resources are dependent upon a data volume to process. For example, if received seismic data is less than 100 GB, a current desktop- or laptop-type computer is enough to perform the described processing. However, if received seismic data is larger than 1 TB, supercomputing with a high-performance computing system/cluster is preferred to enhance computational performance.

Described implementations of the subject matter can include one or more features, alone or in combination.

For example, in a first implementation, a computer-implemented method, comprising: sorting received shot gathers to a common receiver gather; computing a target three-dimensional (3D) amplitude spectrum of seismic wavefield direct arrivals from synthetic data; computing a 3D amplitude spectrum of seismic wavefield direct arrivals in field data for each receiver; calculating a matched filter from the 3D amplitude spectrum of field data to target response; applying the calculated matched filter to downgoing seismic wavefields separated from the common receiver gather to generate filtered downgoing seismic wavefields; performing time-dependent smoothing of the filtered downgoing seismic wavefields to generate smoothed downgoing seismic wavefields; and calculating a cross-correlation between upgoing seismic wavefields separated from the common receiver gather and the smoothed downgoing seismic wavefields.

The foregoing and other described implementations can each, optionally, include one or more of the following features:

A first feature, combinable with any of the following features, further comprising: selecting near-offset first seismic wavefield direct arrivals as an initial constant P-wave velocity model; updating the constant P-wave velocity model from a surface source to a buried receiver; and performing a 3D Fourier transform to convert the updated constant P-wave velocity model to a frequency-wavenumber domain.

A second feature, combinable with any of the previous or following features, further comprising: determining that a comparison between a tolerance value and calculated difference of the 3D amplitude spectrum of field data and the target 3D amplitude spectrum of synthetic data is less than, or equal to, the tolerance value; and recalculating the matched filter from the 3D amplitude spectrum of field data to target response.

A third feature, combinable with any of the previous or following features, further comprising separating the common receiver gather into downgoing seismic wavefields and upgoing seismic wavefields.

A fourth feature, combinable with any of the previous or following features, further comprising: timegating each downgoing seismic wavefield; and performing spatially-dependent aperture filtering on each timegated downgoing seismic wavefield.

A fifth feature, combinable with any of the previous or following features, further comprising performing ground-roll removal on the upgoing seismic wavefields.

A sixth feature, combinable with any of the previous or following features, further comprising: stacking a virtual source shot gather; and initiating output of the virtual source shot gather.

In a second implementation, a non-transitory, computer-readable medium storing one or more instructions executable by a computer system to: sort received shot gathers to a common receiver gather; compute a target three-dimensional (3D) amplitude spectrum of seismic wavefield direct arrivals from synthetic data; compute a 3D amplitude spectrum of seismic wavefield direct arrivals in field data for each receiver; calculate a matched filter from the 3D amplitude spectrum of field data to target response; apply the calculated matched filter to downgoing seismic wavefields separated from the common receiver gather to generate filtered downgoing seismic wavefields; perform time-dependent smoothing of the filtered downgoing seismic wavefields to generate smoothed downgoing seismic wavefields; and calculate a cross-correlation between upgoing seismic wavefields separated from the common receiver gather and the smoothed downgoing seismic wavefields.

The foregoing and other described implementations can each, optionally, include one or more of the following features:

A first feature, combinable with any of the following features, further comprising one or more instructions executable by a computer system to: select near-offset first seismic wavefield direct arrivals as an initial constant P-wave velocity model; update the constant P-wave velocity model from a surface source to a buried receiver; and perform a 3D Fourier transform to convert the updated constant P-wave velocity model to a frequency-wavenumber domain.

A second feature, combinable with any of the previous or following features, further comprising one or more instructions executable by a computer system to: select near-offset first seismic wavefield direct arrivals as an initial constant P-wave velocity model; update the constant P-wave velocity model from a surface source to a buried receiver; and perform a 3D Fourier transform to convert the updated constant P-wave velocity model to a frequency-wavenumber domain.

A third feature, combinable with any of the previous or following features, further comprising one or more instructions executable by a computer system to: determine that a comparison between a tolerance value and calculated difference of the 3D amplitude spectrum of field data and the target 3D amplitude spectrum of synthetic data is less than, or equal to, the tolerance value; and recalculate the matched filter from the 3D amplitude spectrum of field data to target response.

A fourth feature, combinable with any of the previous or following features, further comprising one or more instructions executable by a computer system to separate the common receiver gather into downgoing seismic wavefields and upgoing seismic wavefields.

A fifth feature, combinable with any of the previous or following features, further comprising one or more instructions executable by a computer system to: timegate each downgoing seismic wavefield; and perform spatially-dependent aperture filtering on each timegated downgoing seismic wavefield.

A sixth feature, combinable with any of the previous or following features, further comprising one or more instructions executable by a computer system to: stack a virtual source shot gather; and initiate output of the virtual source shot gather.

In a third implementation, a computer-implemented system, comprising: a computer memory; and a hardware processor interoperably coupled with the computer memory and configured to: sort received shot gathers to a common receiver gather; compute a target three-dimensional (3D) amplitude spectrum of seismic wavefield direct arrivals from synthetic data; compute a 3D amplitude spectrum of seismic wavefield direct arrivals in field data for each receiver; calculate a matched filter from the 3D amplitude spectrum of field data to target response; apply the calculated matched filter to downgoing seismic wavefields separated from the common receiver gather to generate filtered downgoing seismic wavefields; perform time-dependent smoothing of the filtered downgoing seismic wavefields to generate smoothed downgoing seismic wavefields; and calculate a cross-correlation between upgoing seismic wavefields separated from the common receiver gather and the smoothed downgoing seismic wavefields.

The foregoing and other described implementations can each, optionally, include one or more of the following features:

A first feature, combinable with any of the following features, further configured to: select near-offset first seismic wavefield direct arrivals as an initial constant P-wave velocity model; update the constant P-wave velocity model from a surface source to a buried receiver; and perform a 3D Fourier transform to convert the updated constant P-wave velocity model to a frequency-wavenumber domain.

A second feature, combinable with any of the previous or following features, further configured to: determine that a comparison between a tolerance value and calculated difference of the 3D amplitude spectrum of field data and the target 3D amplitude spectrum of synthetic data is less than, or equal to, the tolerance value; and recalculate the matched filter from the 3D amplitude spectrum of field data to target response.

A third feature, combinable with any of the previous or following features, further configured to separate the common receiver gather into downgoing seismic wavefields and upgoing seismic wavefields.

A fourth feature, combinable with any of the previous or following features, further configured to: timegate each downgoing seismic wavefield; and perform spatially-dependent aperture filtering on each timegated downgoing seismic wavefield.

A fifth feature, combinable with any of the previous or following features, further configured to perform ground-roll removal on the upgoing seismic wavefields.

A sixth feature, combinable with any of the previous or following features, further configured to: stack a virtual source shot gather; and initiate output of the virtual source shot gather.

In some implementations, the described methodology can be configured to send messages, instructions, or other communications to a computer-implemented controller, database, or other computer-implemented system to dynamically initiate control of, control, or cause another computer-implemented system to perform a computer-implemented or other function/operation. For example, operations based on data, operations, outputs, or interaction with a GUI can be transmitted to cause operations associated with a computer, database, network, or other computer-based system to perform storage efficiency, data retrieval, or other operations consistent with this disclosure. In another example, interacting with any illustrated GUI can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, shut down/activate a computing system, cause a network interface device to disable, throttle, or increase data bandwidth allowed across a network connection, or sound an audible/visual alarm (such as, a mechanical alarm/light emitting device) as a notification of a result, behavior, determination, or analysis with respect to a computing system(s) associated with the described methodology or interacting with the computing system(s) associated with the described methodology.

In some implementation, the output of the described methodology can be used to dynamically influence, direct, control, influence, or manage tangible, real-world equipment related to hydrocarbon production, analysis, and recovery or for other purposes consistent with this disclosure. For example, real-time data received from an ongoing drilling operation can be incorporated into an analysis performed using the described methodology. Improved quality of produced 2D/3D seismic images, including the real-time data, can be used for various purposes. For example, depending on a generated result(s) of the described methodology, a wellbore trajectory can be modified, a drill speed can be increased or reduced, a drill can be stopped, an alarm can be activated/deactivated (such as, visual, auditory, or voice alarms), refinery or pumping operations can be affected (for example, stopped, restarted, accelerated, or reduced). Other examples can include alerting geo-steering and directional drilling staff when underground obstacles have been detected (such as, with a visual, auditory, or voice alarm). In some implementations, the described methodology can be integrated as part of a dynamic computer-implemented control system to control, influence, or use with any hydrocarbon-related or other tangible, real-world equipment consistent with this disclosure.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
sorting received shot gathers to a common receiver gather;
computing a target three-dimensional (3D) amplitude spectrum of seismic wavefield direct arrivals from synthetic data;
computing a 3D amplitude spectrum of seismic wavefield direct arrivals in field data for each receiver;
calculating a matched filter from the 3D amplitude spectrum of field data to target response;
applying the calculated matched filter to downgoing seismic wavefields separated from the common receiver gather to generate filtered downgoing seismic wavefields;
performing time-dependent smoothing of the filtered downgoing seismic wavefields to generate smoothed downgoing seismic wavefields; and
displaying a graphical user interface of a cross-correlation between upgoing seismic wavefields separated from the common receiver gather and the smoothed downgoing seismic wavefields, the cross-correlation associated with a time-lapsed seismic image of a near-surface structure.

2. The computer-implemented method of claim 1, further comprising:
selecting near-offset first seismic wavefield direct arrivals as an initial constant P-wave velocity model;
updating the constant P-wave velocity model from a surface source to a buried receiver; and
performing a 3D Fourier transform to convert the updated constant P-wave velocity model to a frequency-wavenumber domain.

3. The computer-implemented method of claim 1, further comprising:
determining that a comparison between a tolerance value and calculated difference of the 3D amplitude spectrum of field data and the target 3D amplitude spectrum of synthetic data is less than, or equal to, the tolerance value; and
recalculating the matched filter from the 3D amplitude spectrum of field data to target response.

4. The computer-implemented method of claim 1, further comprising separating the common receiver gather into downgoing seismic wavefields and upgoing seismic wavefields.

5. The computer-implemented method of claim 4, further comprising:
timegating each downgoing seismic wavefield; and
performing spatially-dependent aperture filtering on each timegated downgoing seismic wavefield.

6. The computer-implemented method of claim 1, further comprising performing ground-roll removal on the upgoing seismic wavefields.

7. The computer-implemented method of claim 1, further comprising:
stacking a virtual source shot gather; and
initiating output of the virtual source shot gather.

8. A non-transitory, computer-readable medium storing one or more instructions executable by a computer system to:
sort received shot gathers to a common receiver gather;
compute a target three-dimensional (3D) amplitude spectrum of seismic wavefield direct arrivals from synthetic data;
compute a 3D amplitude spectrum of seismic wavefield direct arrivals in field data for each receiver;
calculate a matched filter from the 3D amplitude spectrum of field data to target response;
apply the calculated matched filter to downgoing seismic wavefields separated from the common receiver gather to generate filtered downgoing seismic wavefields;
perform time-dependent smoothing of the filtered downgoing seismic wavefields to generate smoothed downgoing seismic wavefields; and
display a graphical user interface of a cross-correlation between upgoing seismic wavefields separated from the common receiver gather and the smoothed downgoing seismic wavefields, the cross-correlation associated with a time-lapsed seismic image of a near-surface structure.

9. The non-transitory, computer-readable medium of claim 8, further comprising one or more instructions executable by a computer system to:
select near-offset first seismic wavefield direct arrivals as an initial constant P-wave velocity model;
update the constant P-wave velocity model from a surface source to a buried receiver; and
perform a 3D Fourier transform to convert the updated constant P-wave velocity model to a frequency-wavenumber domain.

10. The non-transitory, computer-readable medium of claim 8, further comprising one or more instructions executable by a computer system to:
determine that a comparison between a tolerance value and calculated difference of the 3D amplitude spectrum of field data and the target 3D amplitude spectrum of synthetic data is less than, or equal to, the tolerance value; and
recalculate the matched filter from the 3D amplitude spectrum of field data to target response.

11. The non-transitory, computer-readable medium of claim 8, further comprising one or more instructions executable by a computer system to separate the common receiver gather into downgoing seismic wavefields and upgoing seismic wavefields.

12. The non-transitory, computer-readable medium of claim 11, further comprising one or more instructions executable by a computer system to:
timegate each downgoing seismic wavefield; and
perform spatially-dependent aperture filtering on each timegated downgoing seismic wavefield.

13. The non-transitory, computer-readable medium of claim 8, further comprising one or more instructions executable by a computer system to perform ground-roll removal on the upgoing seismic wavefields.

14. The non-transitory, computer-readable medium of claim 8, further comprising one or more instructions executable by a computer system to:
 stack a virtual source shot gather; and
 initiate output of the virtual source shot gather.

15. A computer-implemented system, comprising:
 a computer memory; and
 a hardware processor interoperably coupled with the computer memory and configured to:
 sort received shot gathers to a common receiver gather;
 compute a target three-dimensional (3D) amplitude spectrum of seismic wavefield direct arrivals from synthetic data;
 compute a 3D amplitude spectrum of seismic wavefield direct arrivals in field data for each receiver;
 calculate a matched filter from the 3D amplitude spectrum of field data to target response;
 apply the calculated matched filter to downgoing seismic wavefields separated from the common receiver gather to generate filtered downgoing seismic wavefields;
 perform time-dependent smoothing of the filtered downgoing seismic wavefields to generate smoothed downgoing seismic wavefields; and
 display a graphical user interface of a cross-correlation between upgoing seismic wavefields separated from the common receiver gather and the smoothed downgoing seismic wavefields, the cross-correlation associated with a time-lapsed seismic image of a near-surface structure.

16. The computer-implemented system of claim 15, further configured to:
 select near-offset first seismic wavefield direct arrivals as an initial constant P-wave velocity model;
 update the constant P-wave velocity model from a surface source to a buried receiver; and
 perform a 3D Fourier transform to convert the updated constant P-wave velocity model to a frequency-wavenumber domain.

17. The computer-implemented system of claim 15, further configured to:
 determine that a comparison between a tolerance value and calculated difference of the 3D amplitude spectrum of field data and the target 3D amplitude spectrum of synthetic data is less than, or equal to, the tolerance value; and
 recalculate the matched filter from the 3D amplitude spectrum of field data to target response.

18. The computer-implemented system of claim 15, further configured to separate the common receiver gather into downgoing seismic wavefields and upgoing seismic wavefields.

19. The computer-implemented system of claim 18, further configured to:
 timegate each downgoing seismic wavefield; and
 perform spatially-dependent aperture filtering on each timegated downgoing seismic wavefield.

20. The computer-implemented system of claim 15, further configured to:
 perform ground-roll removal on the upgoing seismic wavefields;
 stack a virtual source shot gather; and
 initiate output of the virtual source shot gather.

* * * * *